Nov. 20, 1923.

W. WRIGHT 1,475,152

COMBINED TYPEWRITING AND COMPUTING MACHINE

Filed June 29, 1910      13 Sheets-Sheet 1

Witnesses:
John A. Rennie
Sigmund Schiff

Inventor:
Walter Wright
By B.C. Stickney
his Attorney.

Nov. 20, 1923.

W. WRIGHT 1,475,152

COMBINED TYPEWRITING AND COMPUTING MACHINE

Filed June 29, 1910     13 Sheets-Sheet 2

Fig. 2.

Witnesses:
John A. Rennie
Sigmund Schiff

Inventor:
Walter Wright
By D.C. Stickney
his Attorney.

Nov. 20, 1923. 1,475,152
W. WRIGHT
COMBINED TYPEWRITING AND COMPUTING MACHINE
Filed June 29, 1910 13 Sheets-Sheet 3

Witnesses:
John A. Rennie
Sigmund Schiff

Inventor:
Walter Wright
By D. C. Stickney
Attorney.

Nov. 20, 1923.
W. WRIGHT
COMBINED TYPEWRITING AND COMPUTING MACHINE
Filed June 29, 1910 13 Sheets-Sheet 4
1,475,152
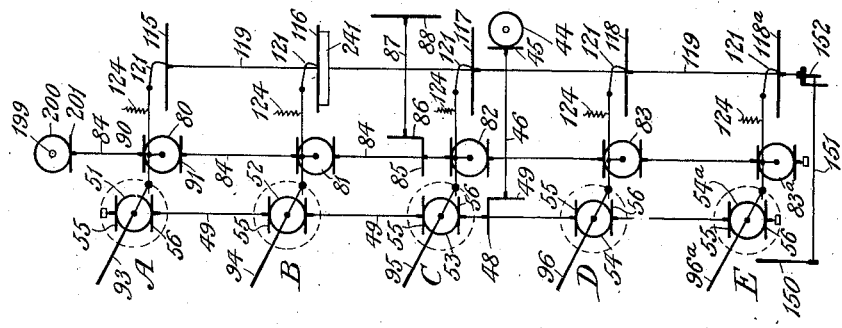
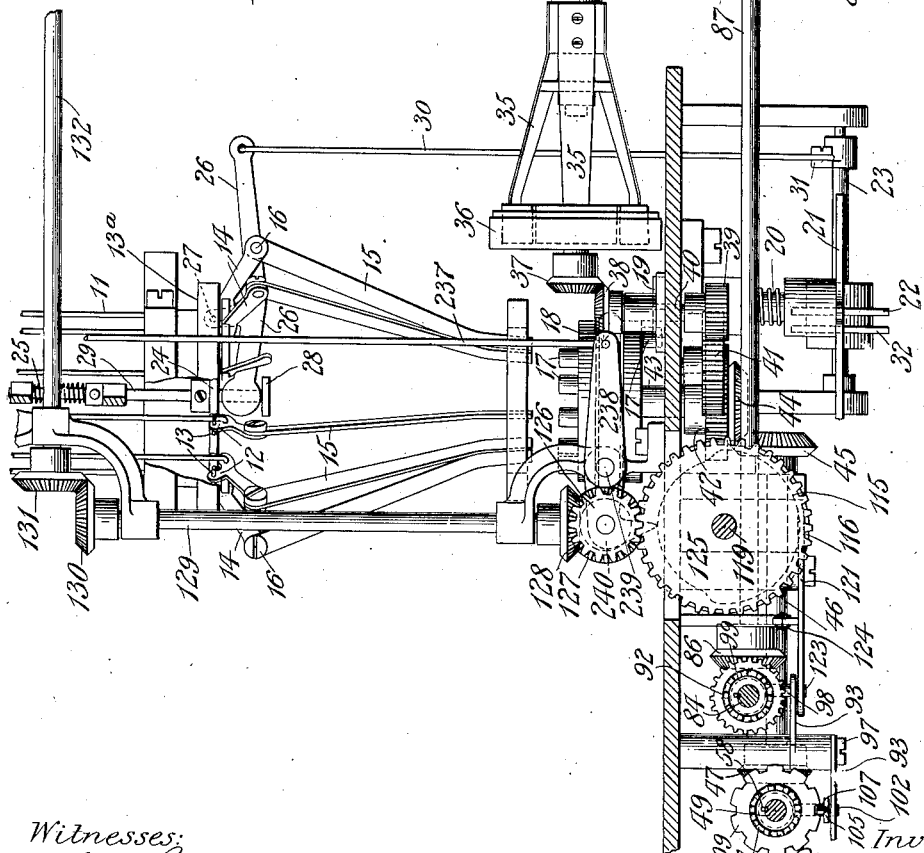
Witnesses:
John A. Rennie
Sigmund Schiff
Inventor
Walter Wright
By
B. C. Stickney
his Attorney.

Nov. 20, 1923.
W. WRIGHT
1,475,152
COMBINED TYPEWRITING AND COMPUTING MACHINE
Filed June 29, 1910 13 Sheets-Sheet 5
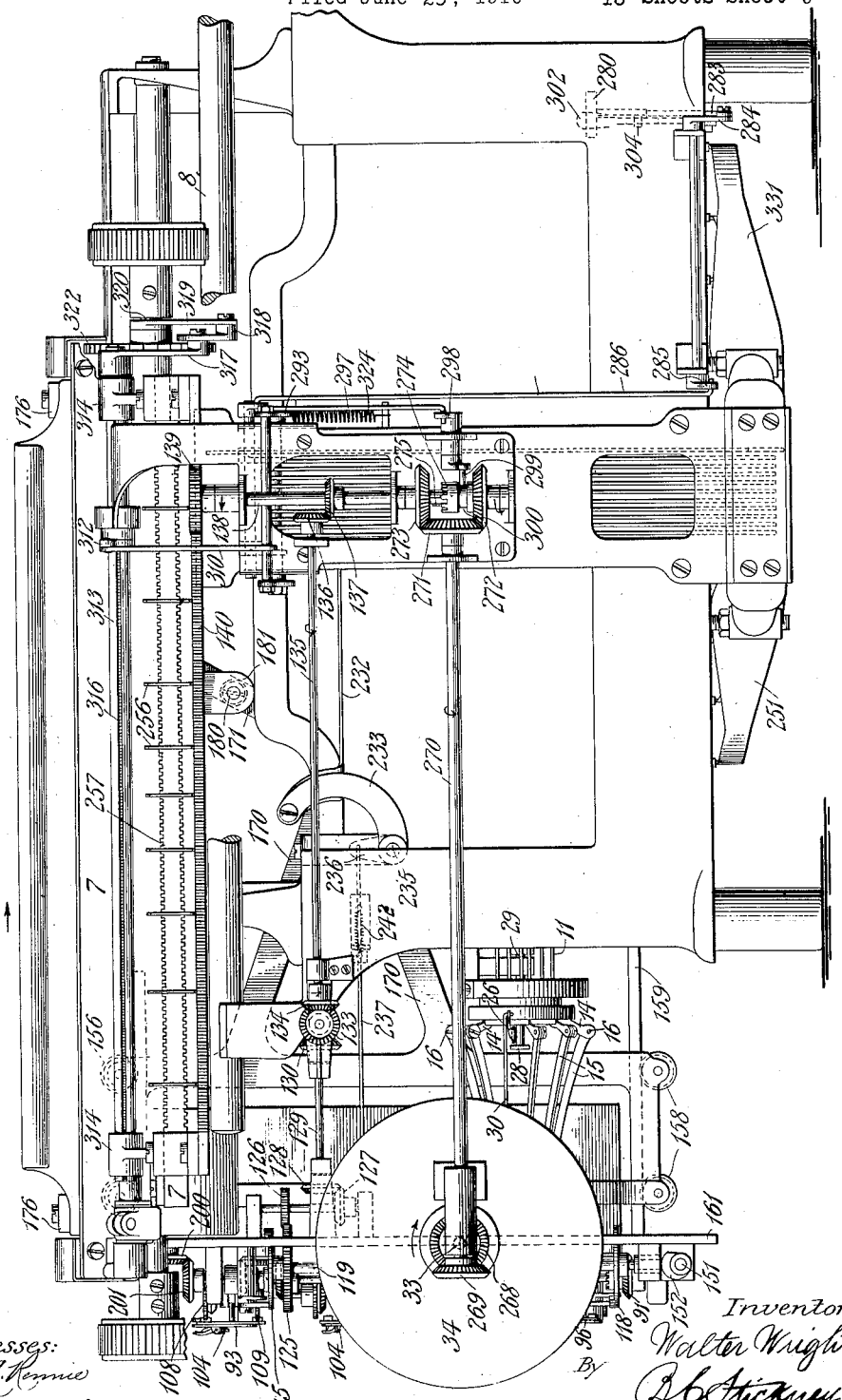

Nov. 20, 1923.　　　　　　　　　　　　　　　　　1,475,152
W. WRIGHT
COMBINED TYPEWRITING AND COMPUTING MACHINE
Filed June 29, 1910　　　13 Sheets-Sheet 6
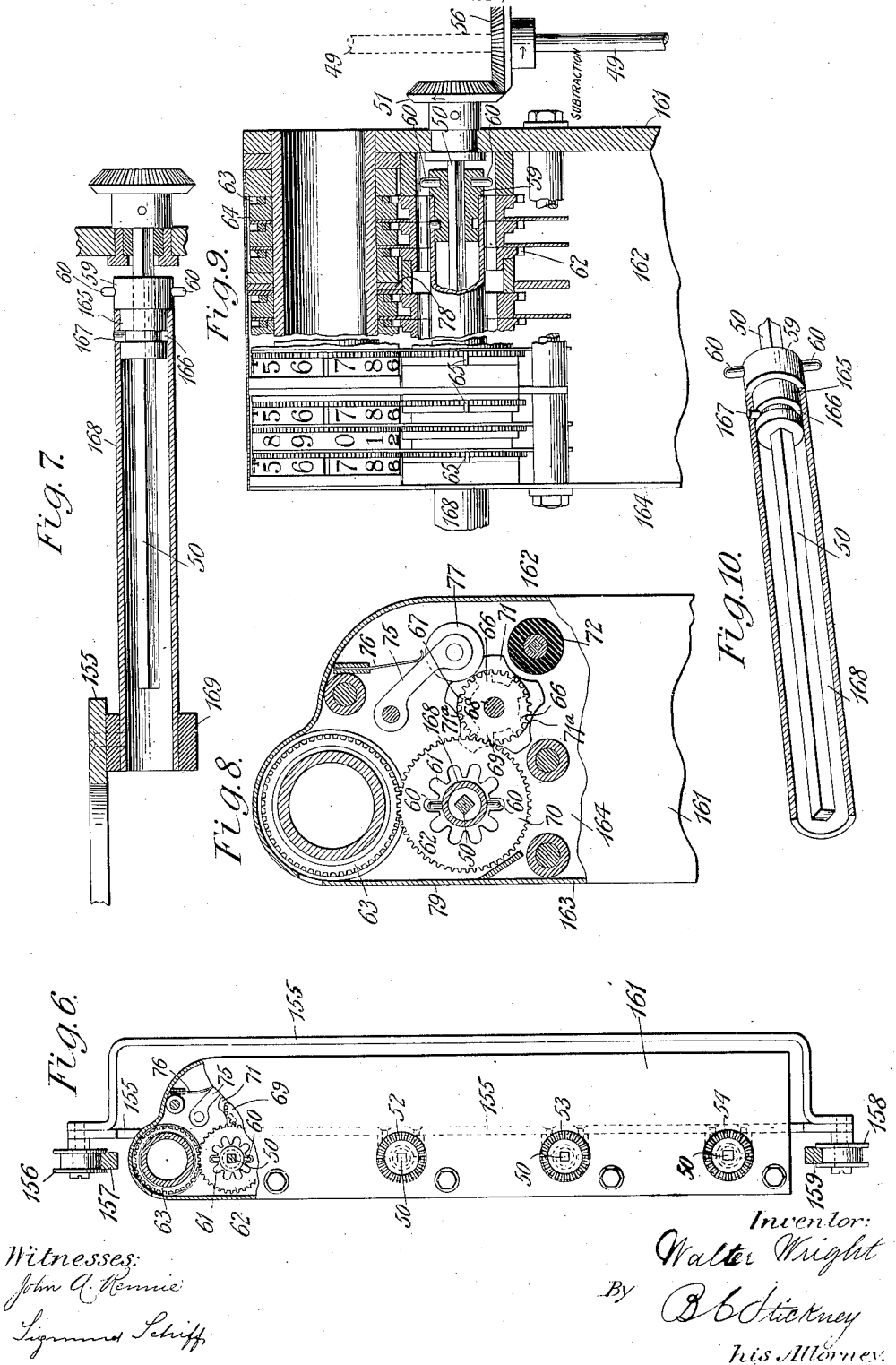

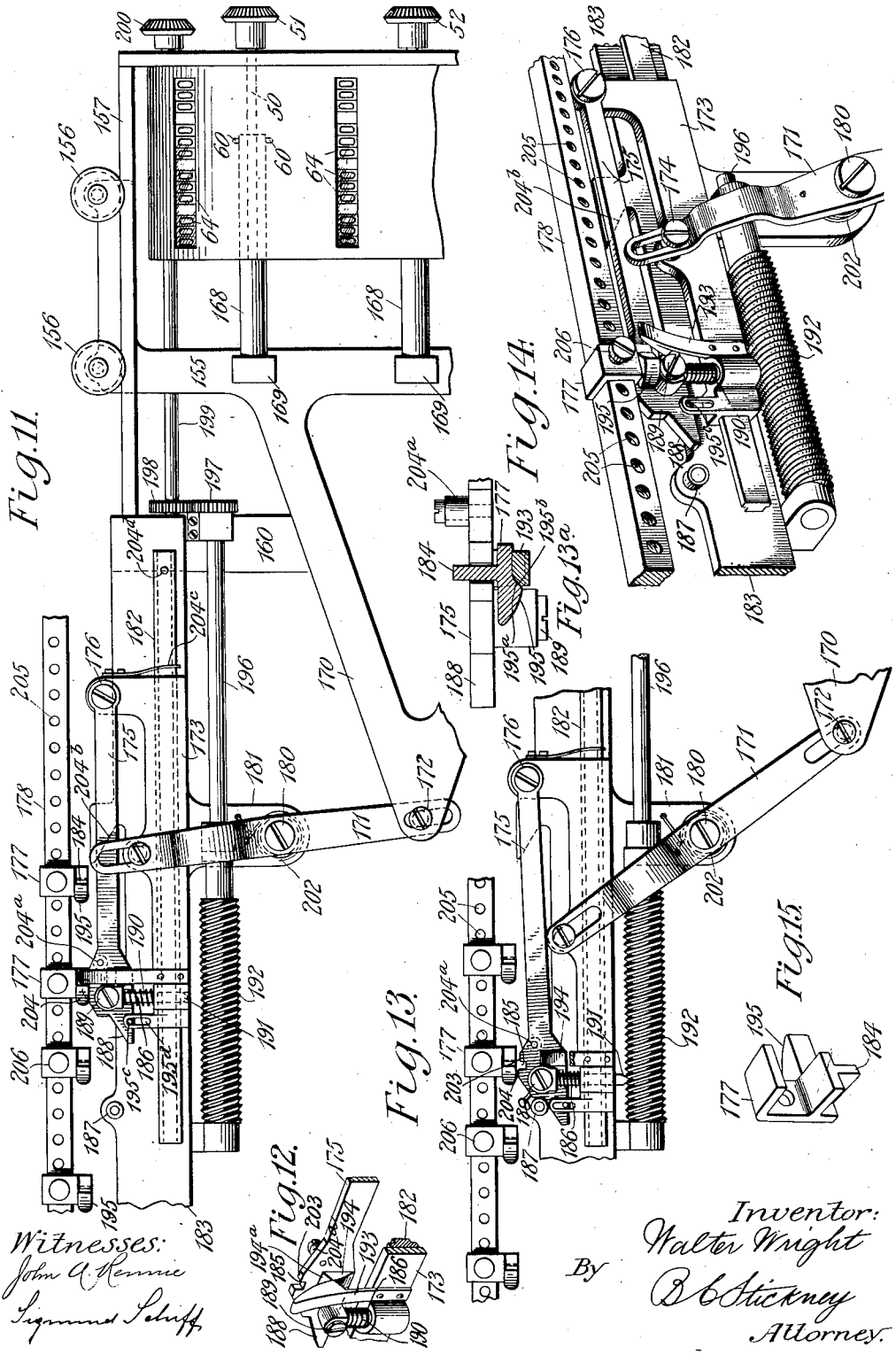

Nov. 20, 1923.  
W. WRIGHT  
1,475,152  
COMBINED TYPEWRITING AND COMPUTING MACHINE  
Filed June 29, 1910   13 Sheets-Sheet 8
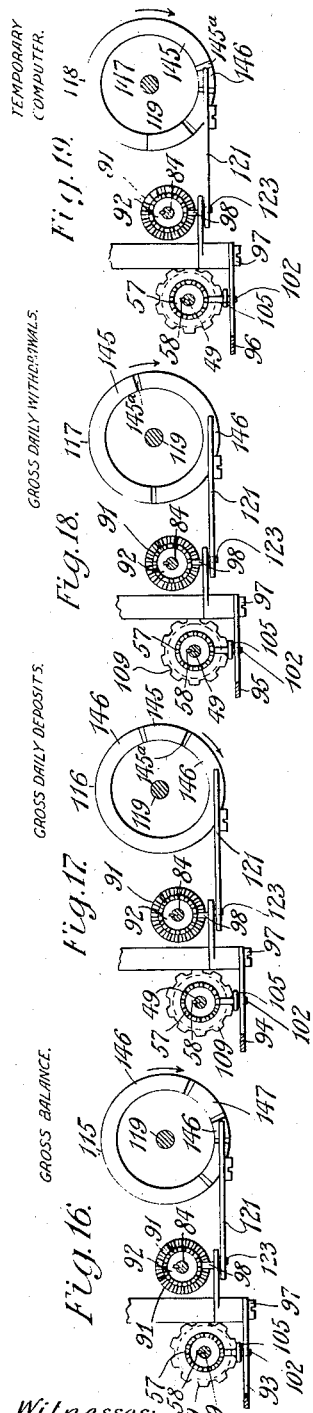
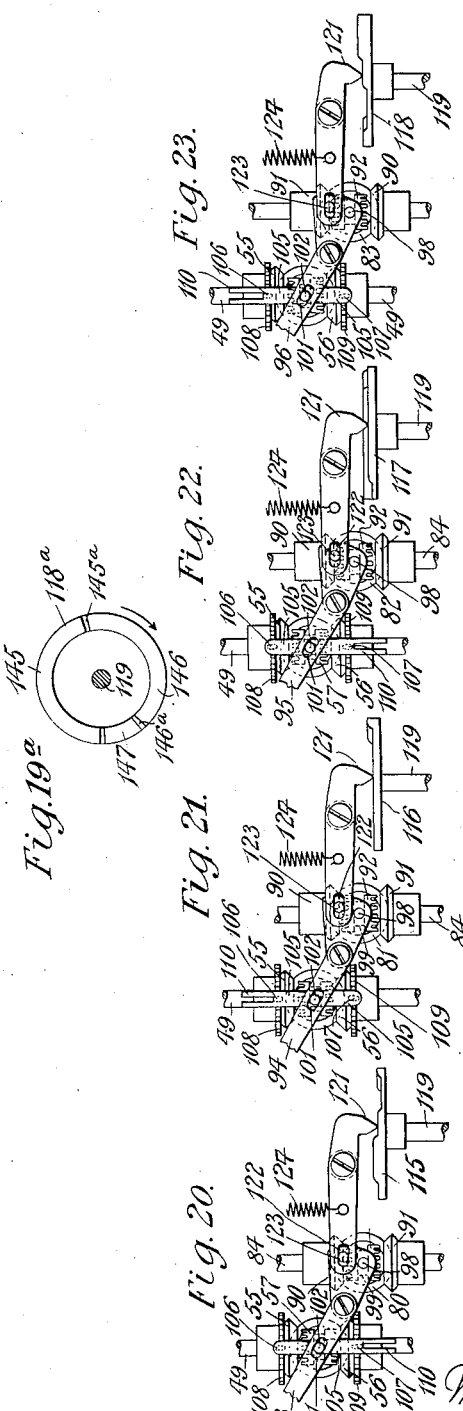
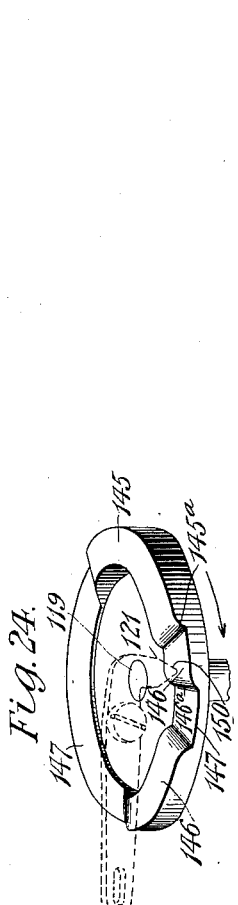

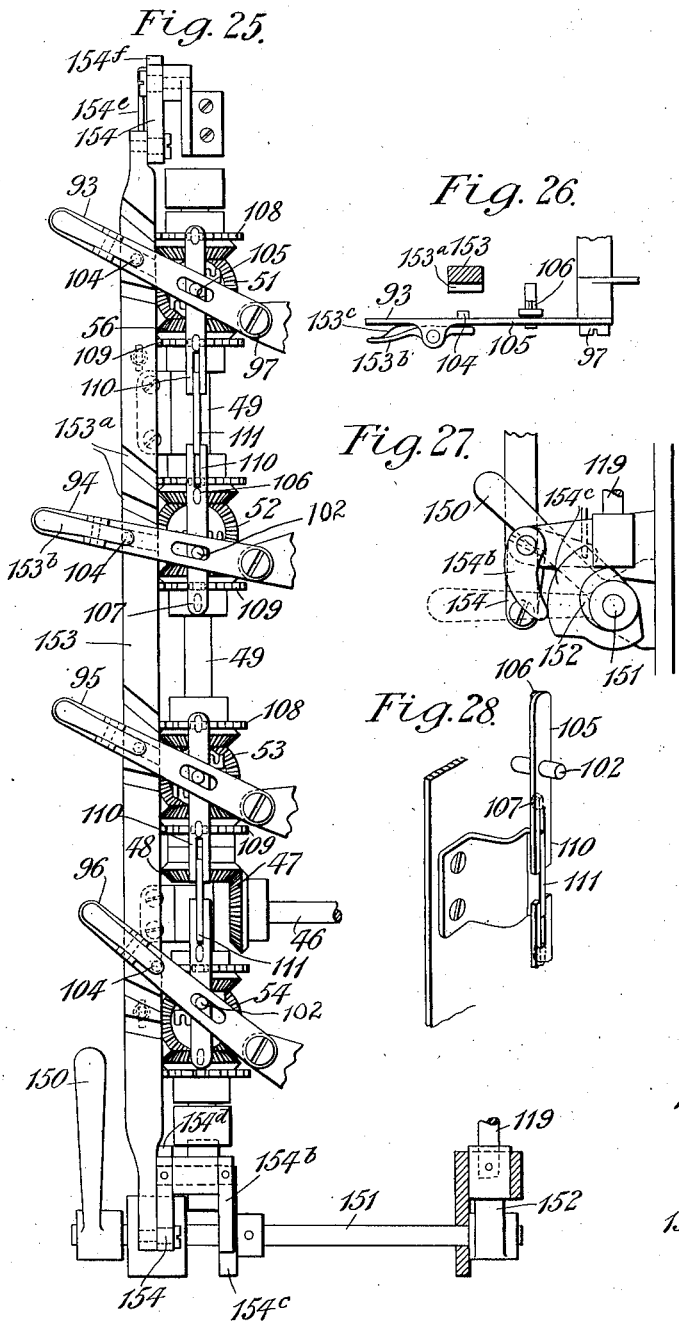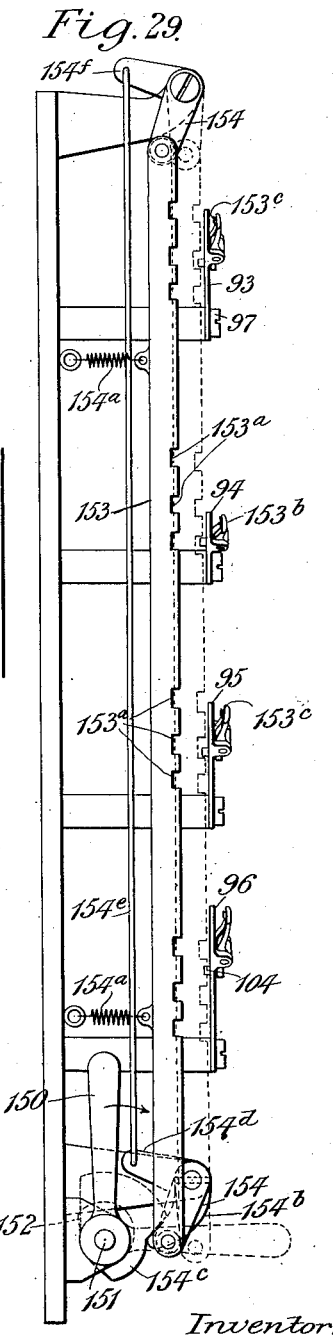

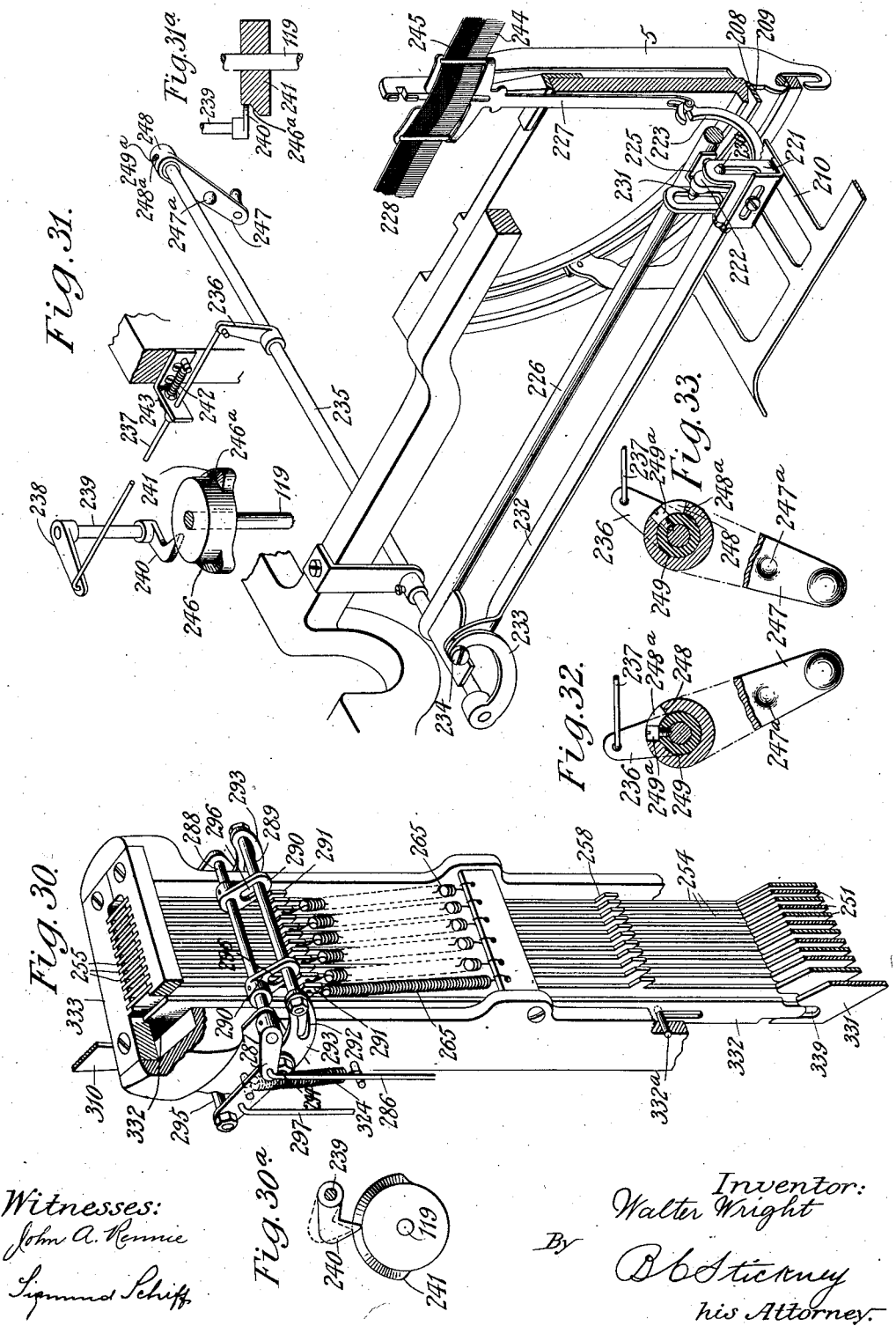

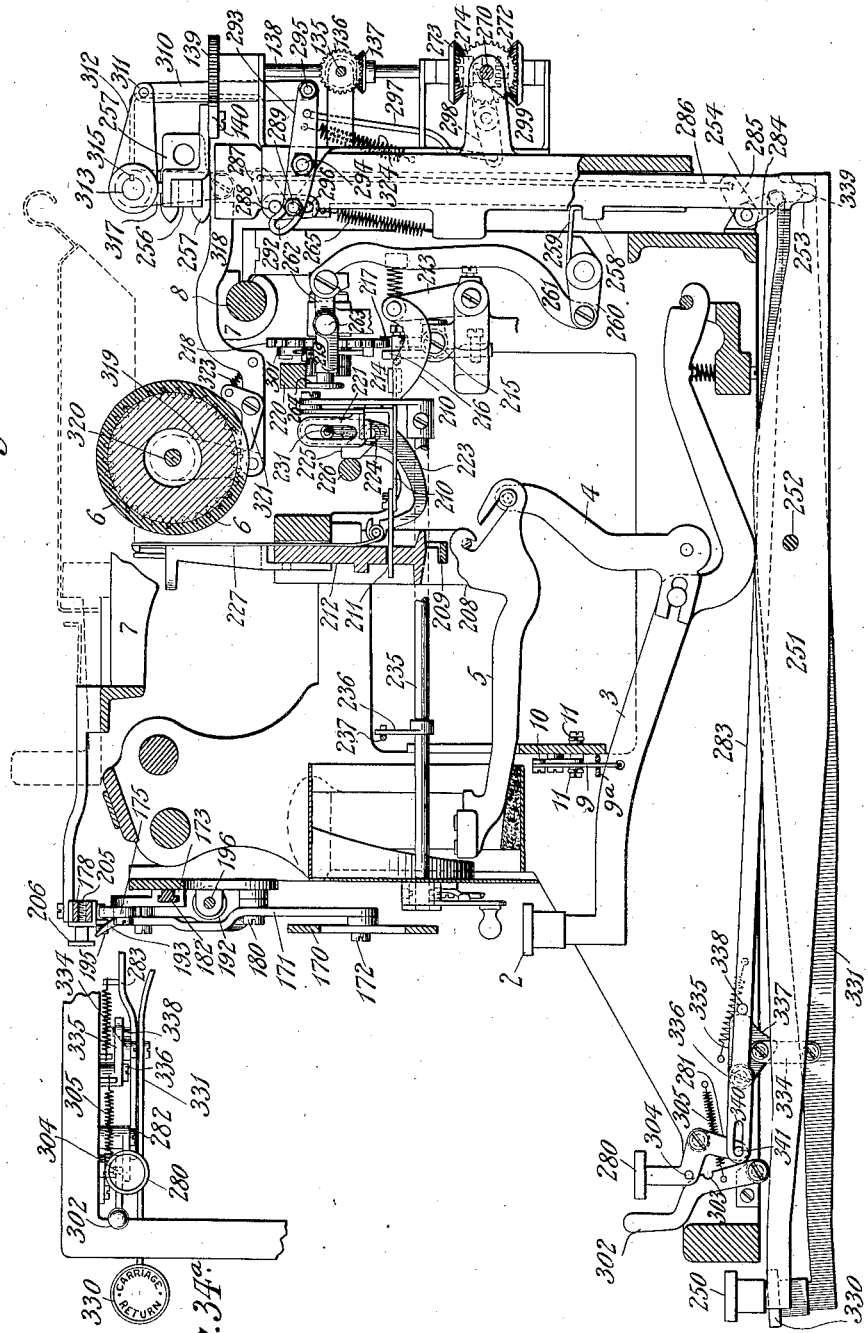

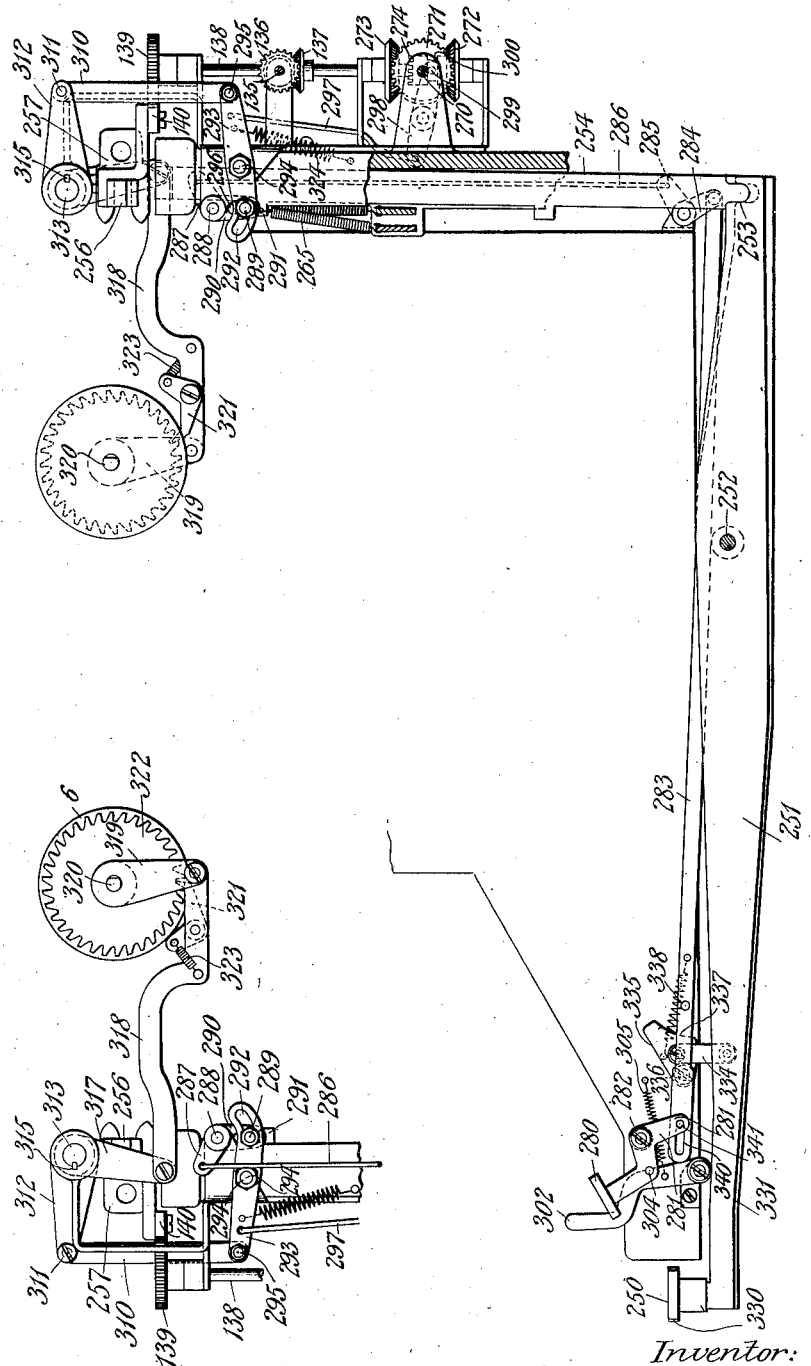

Nov. 20, 1923.                                                1,475,152
                         W. WRIGHT
            COMBINED TYPEWRITING AND COMPUTING MACHINE
                    Filed June 29, 1910        13 Sheets-Sheet 13

| Date 1910 | Prior Balance | Deposits | Checks | | | | | Total Checks | Present Balance |
|---|---|---|---|---|---|---|---|---|---|
| 1/6 | 1,234.56 | 13,456.78 | 1,456.75 | 23.45 | 6.75 | 123.56 | 125.00 | 1,735.51 | 12,955.83 |
| 1/7 | 12,955.83 | 354.67 | 4,567.65 | 15.00 | 12.34 | 125.00 | 340.60 | 5,701.56 | 7,608.94 |
|   |   |   | 43.56 | 5.65 | 75.00 | 25.65 | 1.69 |   |   |
|   |   |   | 176.54 | 234.56 | 1.34 | 76.98 |   |   |   |
| 1/8 | 7,608.94 |   | 5,687.00 | 600.00 | 10.89 | 389.11 | 259.00 | 10,000.00 | 2,391.06 |
|   |   |   | 313.00 | 200.00 | 20.75 | 800.00 | 300.00 |   |   |
|   |   |   | 700.00 | 450.75 |   | 269.50 |   |   |   |
| 1/9 | 2,391.06 | 15,000.00 | 175.00 | 75.65 | 65.75 | 100.00 | 500.00 | 1,136.00 | 11,473.06 |
|   |   |   | 150.00 | 35.35 | 34.25 |   |   |   |   |
| 1/10 | 11,473.06 | 12,456.78 | 500.00 | 100.00 | 7.85 | 25.00 | 120.00 | 752.85 | 23,176.99 |

Witnesses:                                    Inventor:
John A. Rennie                          By    Walter Wright
Sigmund Schiff                                D.C. Stickney
                                              his Attorney.

Patented Nov. 20, 1923.

1,475,152

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

Application filed June 29, 1910. Serial No. 569,502.

*To all whom it may concern:*

Be it known that I, WALTER WRIGHT, a citizen of the United States, residing in New York, in the county of New York and State of New York, have invented certain new and useful Improvements in Combined Typewriting and Computing Machines, of which the following is a specification.

This invention relates principally to computing machines, and particularly computing mechanism combined with typewriting mechanism.

One of the principal objects of the invention is to enable accounts to be kept and book-keeping to be performed upon the machine, so that a leaf from a loose-leaf ledger, or other blank form, may be inserted in the typewriter, and amounts written thereon in various columns, such amounts being automatically added or subtracted as the case may be, so that the accounts may be accurately computed, and so that a duplicate copy or copies of the account may be made without liability of error in copying.

A further object of the invention is to enable the machine, when employed for keeping the accounts of customers of a bank, to show the gross balance that the bank has on hand at any time, and also to show the gross daily deposits and the gross daily withdrawals.

In carrying out this portion of the invention, a series of computing heads is connected to a common driving-shaft in such a manner as to enable any computing head to either add or subtract independently of the other computing heads during the revolution of said driving shaft; provision being also made for enabling any one or more of said computing heads to be silenced during the rotation of said driving shaft. Said common driving-shaft is controlled by the numeral keys of the typewriter, it being connected to an escapement wheel which is power driven, and the movements of which differ in extent according to the value of the keys depressed. A clutching device connects each computing head to said common drive-shaft, and the clutching devices are operated automatically as the paper-carriage travels in letter-feeding direction; so that when writing is done in any column upon the work sheet, certain of the computing heads will add and certain will subtract, and certain will remain silenced, as the case may be. In some cases the number written in one column is subtracted from or added to the number written in another column; the machine thus performing cross computation, when required. Provision is also made for listing separately the checks of the customer and computing their total.

Each computing head comprises a set of number-bearing wheels and a master wheel, the latter being rotated by a shaft, which is connected by a clutch to the common drive-shaft. The master wheel in the present instance is splined upon its shaft; and in order to produce the necessary step-by-step movement, each master wheel is mounted upon a mandrel or arbor, and these mandrels are fixed upon a carriage which is connected to the typewriter carriage. The range of movement of the typewriter carriage is in this instance much greater than that of the master wheel carriage; and disconnection is automatically effected between the two carriages at the desired points along the line of writing, the master-wheel carriage returning automatically to position to begin computation in the succeeding column.

The return of the master wheel carriage, in the present instance is effected largely or wholly through the operation of a power-driven constantly-rotating return-screw, which is an advantage where the computing carriage is heavy, said screw being connected to the same electric motor that rotates the common drive-shaft of the computing mechanism.

There is also shown an automatic means for shifting the ribbon mechanism of the typewriter, so that the amounts to be subtracted will be printed in a different color from those which are to be added. This automatic ribbon shifting mechanism is connected to the same device that determines in each column which computing head or heads shall add, which subtract, and which be silenced.

Provision is also made for disconnecting the automatic devices which control the rotation of the computing heads, and which also control the shifting of the ribbon from one color to another; and after such disconnection, any of the computing heads may be controlled by manually adjustable means independently of the remaining computing heads; and the color shifting mechanism can also be manually adjusted.

The paper carriage of the typewriter is, in the present instance, driven by the same electrical motor which operates the computing mechanism; and for check-listing and other purposes said motor may be caused to drive the carriage backwardly at the completion of the writing of the amount of each check, to a position to begin the writing of the amount of the next check, on the next line of writing. The decimal tabulating mechanism usually employed upon an Underwood typewriting machine is improved for the purpose of making it useful for check-listing or other back-tabulation; the depression of any decimal tabulator key, during the back tabulating operation, serving to reverse the drive of the paper carriage and to arrest the same at the desired decimal point.

The back decimal-tabulating devices are shown connected to means for line-spacing the paper at each tabulating operation. The computing carriage is connected to the typewriter carriage for certain purposes during the operation of the tabulating device both forwardly and backwardly. The same decimal keys serve for both kinds of tabulation; the shiftable devices being provided for determining when the carriage shall run forwardly or backwardly at the tabulating operation.

Other objects and advantages will hereinafter appear.

In the accompanying drawings,

Figure 2 is a front part-sectional elevation of the same.

Figure 4 is a part-sectional plan, showing a portion of the connections between the figure keys and the computing mechanism.

Figure 1:
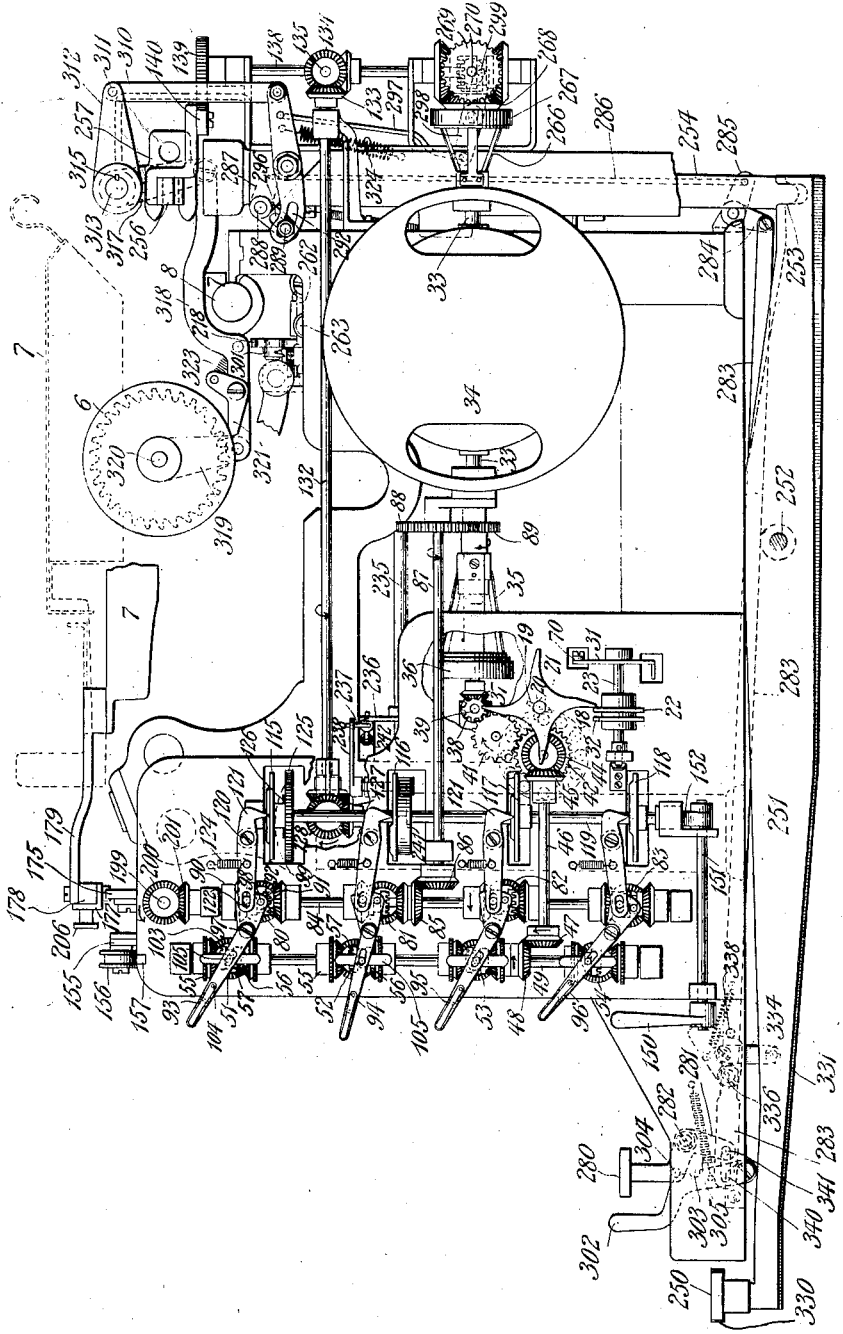
Figure 1 is a side elevation showing the present improvements applied to an Underwood front strike typewriting machine.

Figure 4ª is a diagrammatic elevation corresponding to the left-hand upper portion of Figure 1, but showing an arrangement of five computing heads instead of the four seen at Figure 1.

Figure 5 is a rear elevation of the machine.

Figure 6 is a side elevation of the computing-head casing, seen at Figures 1 and 2, the casing partly broken away to show the wheels in the upper computing head. This view also shows a side elevation of the master-wheel carriage.

Figure 7 is a horizontal section showing a master-wheel, the drive shaft to which it is splined, and the arbor or mandrel by which it is moved along the computing head.

Figure 8 is a sectional side elevation of the mechanism in the upper computing head.

Figure 9 is a part-sectional front elevation of the same.

Figure 10 is a sectional view of a master-wheel with drive shaft and mandrel.

Figure 11 is a front elevation, showing the master-wheel carriage connected to the paper carriage to be driven thereby.

Figure 12 is a perspective view of the latch for depressing and holding down a movable hook or coupling, which releasably connects the master-wheel carriage to the paper carriage of the typewriting machine.

Figure 13 is a view like Figure 11, but showing disconnection of said hook or coupling.

Figure 13ª is a part-sectional plan of one end of said hook, showing, in section, the latch whereby it is held down, and also showing, in section, a portion of the collar and the tooth engaged by the hook.

Figure 14 is a perspective view of a portion of the device seen at Figure 11.

Figure 15 is a rear perspective view of one of the collars seen at Figure 11.

Figures 16 to 19ª show a set of five revolving cams, all fixed upon one vertical shaft, for either silencing or controlling the direction in which computation is performed at different times upon the five computing heads seen at Figure 4ª.

Figures 20 to 23 are side elevations of the devices seen at Figures 16 to 19.

Figure 24 is a perspective view of the cam disk seen at Figure 19.

Figure 25 is a side elevation of one of the vertical drive-shafts seen at Figure 1, together with the clutch-controlling levers for the computing heads, and also means shiftable to position to permit said levers to be set manually when required.

Figure 26 is a sectional plan of one of the levers and its locking means seen at Figure 25.

Figure 27 is an elevation of the lower portion of the vertical locking bar seen at Figure 25, together with the rock shaft which moves said locking bar into and out of effective position, and at the same time either silences or renders effective the cams seen at Figures 16 to 23.

Figure 28 is a perspective view of the devices seen at Figure 25, for locking any silenced computing head against accidental operation.

Figure 29 is a side elevation of the levers and locking bar therefor, seen at Figure 25, said locking bar being shown in full lines as silenced, and in dotted lines in effective position.

Figure 30 is a perspective front view of a set of decimal tabulating stops and appurtenances.

Figure 30ª is a plan of a cam for automatically controlling the shifting of the ribbon-vibrating mechanism.

Figure 31 is a perspective rear view of the ribbon vibrating device, and the shiftable mechanism whereby either one or the other stripe or color band of the ribbon is caused to cover the printing point at the type strokes.

Figure 31ª is a sectional elevation of the devices seen at Figure 30ª.

Figure 32 shows one position and Figure 33 another position, of a handle seen at Figure 31, whereby the ribbon may be manually shifted to print another color when required.

Figure 34 is a sectional elevation taken from front to rear about centrally of the machine.

Figure 34ª is a plan of the front left-hand end corner of the machine, showing the special carriage-return key and certain of the tabulating devices.

Figure 35 is an elevation of part of the tabulating and line-spacing mechanism, looking at the left-hand side of the machine.

Figure 36 is a similar view looking at the right-hand side of the machine, and showing also the connections from the tabulating devices to their operating keys.

Figure 37 shows a customer's sheet or leaf taken from the loose-leaf ledger or the like, and illustrating one manner of keeping a customer's account by using the present improvements.

*Typewriting mechanism.*—Depressible alphabet keys 1 and figure keys 2 are mounted on levers 3, Fig. 34 connected by bell-cranks 4 to type bars 5, to swing the latter upwardly and rearwardly against a platen 6, mounted on a paper carriage 7, said carriage partly supported upon a rear rail 8.

*Connections from numeral keys to escapement wheel of computing mechanism.*—Each of the levers 3 bearing the figure keys 2, is connected by a vertical link 9 to a bell-crank 10. From each bell-crank a horizontal link 11 extends to the right at Figure 2, each link pivoted at its right-hand end, to an arm 12. The vertical links 9 are shiftable by means of a bar 9ª out of connection with the key levers at will. Said arms 12 are grouped radially about a common center as seen at Figure 4, and turn upon fulcrums 13, in fixed disks 13ª, Figure 4; and, taken together with arms 14, form levers for operating jacks 15, the latter pivoted at 16 to said arms 14. The function of said jacks is to set or project any of a circular group of escapement teeth 17, carried upon a power-driven primary escapement wheel 18, Figures 1 and 4. The depression of any figure key 2 acts through the link 9 to rock the bell-crank 10, and pull the corresponding link to the left at Figure 2, thereby vibrating the lever 12, 14, thrusting the jack 15 thereon to the right, and projecting the tooth 17 from idle to effective position.

Said escapement wheel 18, which is under constant rotational pressure, as will presently be explained, is normally prevented from rotating by reason of the engagement of the projected tooth 17 with a pinion 19, Fig. 1 which is fixed upon a horizontal shaft 20, upon which is also fixed a secondary escapement wheel 21, having four teeth, like the pinion 19. The primary escapement wheel, by means of its projected tooth, tends to rotate the pinion and hence the secondary escapement wheel 21, the latter being normally restrained by a dog 22 on a rock shaft 23, Figs. 1 and 4.

Besides projecting the escapement pin, as already described, the depressed key rocks said rock shaft 23. This movement is effected by means of a universal plate or disk 24, engageable by any of the arms 12, and movable thereby to the left at Figure 2, against the tension of a returning spring 25, Fig. 4. One end of a lever 26, fulcrumed at 27, works between said universal plate or disk 24 and a head 28 formed on a horizontal rod 29, which carries said universal plate or disk. The other end of said lever is connected by a link 30 to an arm 31, fixed on said rock shaft 23. The movement of the rock shaft and dog 22 effected by the depressed key, permits the escapement wheel 21 to escape from the dog and to be engaged by a companion dog 32, (on 23,) which retains it as long as the key is held down.

Upon the release of the figure key from pressure, the rock shaft 23 returns to normal position under the influence of spring 25, and the secondary escapement wheel 21 escapes from the dog 32, and in consequence the primary escapement wheel 18 revolves until it is arrested by means of that tooth 17, which has just been projected by the depressed key. This determines the extent of rotation of the computing wheels, presently to be described.

*Motor and connections to escapement wheel, etc.*—The shaft 33 of a constantly rotating motor 34 carries a friction clutch 35, Figure 4, which slips around in a head or drum 36, the latter being connected to the primary escapement wheel 18 to drive both it and the computing wheels connected thereto. The connection between said friction drum 36 and the escapement wheel comprises a bevel pinion 37, a bevel pinion 38 in mesh therewith, a pinion 39 connected by a shaft 40 to said pinion 38, an idle gear 41 meshing with 39, and a gear 42 meshing with 41 and fixed upon the shaft 43 that carries the primary escapement wheel 18.

*Connections from the escapement wheel to the computing wheels.*—Meshing with a bevel pinion 44, attached upon the shaft 43 of the primary escapement wheel 18, is a bevel pinion 45, Fig. 1 on one end of a horizontal shaft 46, which carries at its forward end a bevel pinion 47 meshing with pinion 48 fixed upon a vertical shaft 49. This vertical shaft drives the wheels upon a series of four computing heads, ranging one above another, as seen at the right-hand portion of Figure 2. Each computing head has a horizontal shaft 50, Figures 6–10, carrying at its outer end a bevel gear, said gears numbered from top to bottom 51, 52, 53, 54, whereby the computing wheels may be operated. During the rotation of the universal drive shaft 49, any one of said gears 51 to 54 may be rotated by said drive-shaft either forwardly or backwardly, or may remain motionless; and at the same time any of the remaining gears 51 to 54 may be rotated either forwardly or backwardly; whereby either addition or subtraction may be performed on any one or more of the adding heads, either alone or while a similar amount is being added or subtracted upon any one or more of the remaining computing heads.

For this purpose, any suitable reversing gear or clutch may connect each pinion 51 to 54 with the universal drive shaft 49; said reversing gears being independently reversible or movable to neutral positions, so that while one computing head is adding another may be subtracting, and another may remain silent, and so on.

The reversing gear may comprise in each case an upper bevel gear 55, and a lower bevel gear 56, both constantly in mesh with the main gear, (as 51), of the computing head, and both loose upon the vertical shaft 49. Each reversing gear also comprises a double clutch 57, splined at 58 (Figures 16–19) to the shaft 49, and movable up to connect the pinion 55 to the drive shaft 49; and movable down to connect the pinion 56 to shaft 49; and also capable of being retained in a midway position disengaged from both upper and lower pinions, so that no movement may be communicated to the computing head.

A master wheel 59, Fig. 7, may be splined to the shaft 51, and for this purpose the latter may be made square in cross-section, to fit a bore in the master wheel, which is intended to slide along the shaft. The master wheel may have opposite teeth 60 to engage notches 61 formed interiorly in a computing wheel 62, Figure 8, the latter consisting of a gear or pinion, and meshing with a gear 63 formed on the side of a number-bearing wheel 64. The master wheel 59 moves from one wheel 62 to the next at every operation of the figure keys 2; the computation being first performed upon a wheel of high denomination then upon a wheel of lower denomination, and so on, the numbers being written in the usual way upon the typewriter.

*Tens carrying mechanism.*—At every revolution of each computing wheel in either direction, the wheel next to the left is automatically rotated through one-tenth of a revolution, for carrying 10. This operation is initiated by a special tooth 65, Figure 9, formed upon the side of the computing wheel 62, said tooth 65 engaging one of five equidistant lugs or teeth 66 formed on a carrying-wheel 67, which is loosely supported upon a shaft 68. This tens-carrying wheel 67 is also formed with a pinion 69, on the opposite side of the wheel from the teeth 66 thereof, said pinion being in mesh with gear 70 formed upon the computing wheel 62 of the next higher denomination. The proportion of the pinion 69 to gear 70 is as 1 to 2, so that one-fifth of a revolution of the pinion will effect one-tenth of a revolution of the gear, and hence of the higher computing wheel 62, and hence of the number-wheel 64. The gear 67 is also formed with a middle disk portion 71, between the pinion 69 and the set of teeth 66, said disk having five notches or recesses 71$^a$. One of these recesses is occupied by a soft-rubber cylinder 72, which revolves continuously when a computing head is in one of its active states, either adding or subtracting, and whose function is to aid or complete the movement of the tens-carrying wheel 69. The first part of the movement of the latter is effected by the special tooth 65, upon the computing wheel 62, which is being actuated. This forces the periphery of the disk 71 (that is, the portion between two of the notches 71$^a$), into engagement with the revolving rubber cylinder 72, which catches the disk and causes it to rotate rapidly until the cylinder 72 occupies the next recess in the disk, that is, until said wheel 67 has made one-fifth of a revolution and imparted one-tenth of a revolution to the next higher computing wheel. Each recess or concavity 71$^a$ is sufficiently large to clear the cylinder under normal conditions.

A pivoted detent arm 75, pressed by a spring 76, forces a roll 77 into engagement with one of the seats or recesses in the disk 71, to hold the latter in normal position.

The hub of very third carrying-wheel is of sufficient length to extend through a partition 78, Figure 9, formed in the casing 79, which contains the computing heads, and every third computing wheel 62 and number wheel 64 may be correspondingly formed, so that the wheels are usually divided into groups of three, as set forth in said application.

One of these constantly revolving rubber rolls 72 is provided for each of the four computing heads, and they are kept in constant rotation respectively by means of bevel gears 80, 81, 82, 83, Figure 1. Said bevel gears are operated by a vertical shaft 84, which has, about midway of its height, a pinion 85, meshing with a pinion 86, the latter fixed upon the front end of a horizontal shaft 87, which carries at its rear end a gear 88, which meshes with a pinion 89 fixed upon the constantly revolving drive shaft 33 of the motor 34. Each pinion 80 to 83 is constantly in mesh with a pair of pinions, 90, 91, all of which are loose upon the vertical shaft 84; and a clutch 92 splined upon said shaft 84, may be moved up and down to connect either of said pinions 90 or 91 with said shaft 84, or to disconnect both of the pinions from the shaft concomitantly.

*Adding, subtracting and silencing levers.*—The clutches on the shaft 84 are connected to those on the shaft 49, Figures 1 and 25, so that the rotation of the rubber cylinder in each instance, is caused to be in forward direction, or in backward direction, or silenced, according to whether the clutch on the vertical drive shaft 49 is set for addition or subtraction, or in a midway idle position.

For operating the clutches, there are provided four levers 93, 94, 95, 96, each lever controlling a pair of clutches, one of which is on drive shaft 49, and the other of which is on drive shaft 84. Each lever is pivoted between its ends at 97 and carries at its rear end a pin 98, to engage a peripheral groove 99 in a clutch 92 to slide the same up and down. Forwardly of its pivot, the lever is slotted at 101 to engage a pin 102, which extends into a groove on the clutch 57 on shaft 49; this clutch descending while clutch 92 rises. Each of the levers 93, 94, 95 and 96 may have a yielding detent or pin 104 to hold it in any position. At Figure 1, the top lever is set to silencing position, the next lower lever is set to subtracting position, the next to silencing position, and the next to adding position, so that nothing is done to the uppermost computing head, while the next computing head is subtracting, the third is idle, and the fourth is adding.

Each pin 102 extends through or is formed on both sides of a vertical locking-slide 105, Figures 1, 25, 28, which has upper and lower teeth 106, 107, to engage locking pinions 108, 109, fixed upon the bevel pinions 55, 56, each locking pinion having ten teeth. Each locking slide has a guide fork 110, to engage a fixed guide 111 to keep it in perpendicular position. When the locking slide moves up or down, it releases both pinions. When the slide is in midway position, both pinions are locked. This prevents accidental uncontrolled rotation of any of the pinions, when any adding head is silenced. One of the locking wheels 108, 109 in each pair may be omitted.

*Automatically controlled addition, subtraction and silencing.*—The clutch pairs heretofore described, on the shafts 49 and 84, may be each automatically shifted from time to time, during each line of writing, either alone or together with others of the clutch pairs, this being done by means of four cam disks 115, 116, 117, 118, fixed one above another upon a vertical rotary shaft 119, Figures 1, 16–24, which is connected to the carriage 7 of the typewriting machine to turn as the latter travels; rotating in one direction while the carriage advances in letter-feeding direction, and rotating in the opposite direction while the carriage returns to begin a new line of writing; said shaft 119 preferably making one entire revolution during a full stroke of the carriage. Pivoted upon the framework at 120, are four followers 121, one for each of the cam disks 115 to 118; said followers pivoted between their ends, and their opposite ends slotted at 122, to engage pins 123 upon the rear ends of the levers 93, to control said levers. Each follower has a spring 124 to hold it down upon the cam disk.

Figure 3:
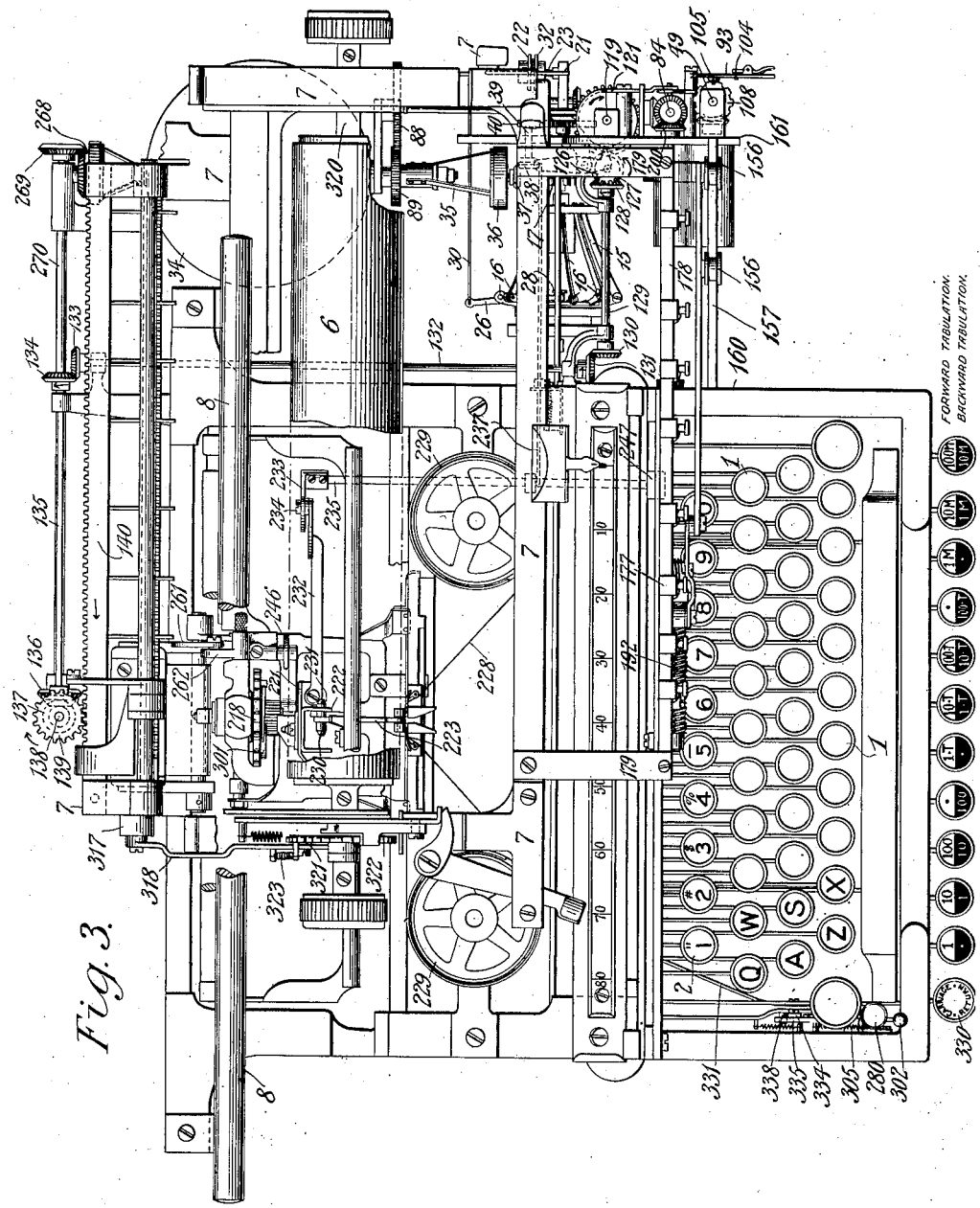
Figure 3 is a plan of the principal portions of the typewriting and computing mechanisms.

The vertical shaft 119, which carries the cam disks 115 to 118, is connected to the carriage 7 by a train of gearing comprising a gear 125 on the upper part of said shaft; a pinion 126 meshing therewith, a bevel pinion 127 fixed to 126, a bevel pinion 128 meshing with 127, a horizontal shaft 129, Figure 3, carrying the pinion 128 at one end, and a bevel pinion 130 at the other end, a bevel pinion 131 meshing with 130 and fixed upon the forward end of a long rearwardly extending horizontal shaft 132, a bevel pinion 133 fixed upon the rear end of 132, and a bevel pinion 134 (meshing with 133), a transverse horizontal shaft 135, carrying 134 at its right-hand end, and also carrying a bevel pinion 136 at its left-hand end, to mesh with a bevel pinion 137 fixed upon a vertical shaft 138, Figures 3 and 5, which carries at its upper end a pinion 139 meshing with a rack 140 fixed upon the carriage 7. The gears in said train are so proportioned that shaft 119 makes one complete revolution while the carriage 7 is moving from one end of its range of travel to the other.

The top face of each cam disk, as 150ª, upon which 121 rests, is divided up into cam faces disposed at different levels, each level surface sloping to the next, so that the follower 121 may be caused to rise and fall at intervals during the travel of the carriage, thereby operating the clutch lever 93 for causing the associated computing head either to add or to subtract or to be silenced. At Figure 24, is shown a perspective view of one form of cam disk, and it will be understood that the several disks may be variously shaped, in order to cause the several computing heads to add or subtract or remain silent at the time required; and it will be perceived that these disks may be so formed and placed, if desired, that the four computing heads may subtract concomitantly or add concomitantly, or so that any one or more of them may be caused to add while any one or more of the remaining heads are caused to subtract, or certain of them may remain silenced. Each computing head or totalizer may act in either direction, or may remain silent, without regard to what any of the remaining computing heads are doing.

The formation of the cams on the several disks may depend upon the character of the work to be done. A certain portion of the disk at Figure 24, designated as 145, is at the highest elevation causing the follower 121 to rise, thereby causing the computing head D to add. On said disk are lower level surfaces 146, 146ª, and when the follower 121 is resting on these surfaces, the computing head D is silenced. Said disk also comprises two bottom level surfaces 147, and when the follower 121 is resting on these, the lever 93 is set for subtracting.

As an illustration of the operation of the automatic device for controlling the operation of the silencing of the computing heads, a sheet of typewritten computation is shown at Figure 37.

The top computing head A, Figure 2, controlled by cam disk 115, Figures 1 and 16, always shows the gross balance that the bank has on hand. For each customer there is employed a loose ledger-leaf or other blank sheet 148, Figure 37. Each day the customer's sheet is inserted in the combined typewriting and computing machine, and there is written thereon the date, the customer's last balance, the total deposits made by the customer that day, the checks charged against him that day, (the amounts of said checks being separately written), the total of said checks, and the balance left after deducting the total of the checks. This customer's sheet is then withdrawn from the machine, and the sheets of the remaining customers are successively written up in the same manner. The next day, the sheets are again placed one by one into the machine and the typewritten computations made, and so on. The computations made on all the sheets affect the top computing head, and as soon as all the customers' sheets are written, said top computing head shows the gross balance held by the bank on that day.

The second computing head B, which is controlled by the cam disk 116, Figures 1 and 17, shows the gross daily deposits. As each customer's sheet is being written, the amount of his deposits is added upon said second adding head, the amounts shown thereon of course growing as the customers' sheets are being written.

The third computing head C, controlled by cam disk 117, Figures 1 and 18, shows the gross amounts withdrawn by means of the checks of all the customers; the amount shown on this adding head of course also growing during the writing of the customers' sheets.

The fourth computing head D, which is controlled by the cam disk 118, Figures 1 and 19, is used only for temporary computation, for figuring up each customer's account as it is being written; the number wheels thereon being then returned to zero, preparatory to computing the account of the next customer.

The fifth computing head E, which is shown diagrammatically at the bottom of Figure 4ª, (which shows the preferred form of the invention), is used only for obtaining the totals of the checks charged against a customer. This computing head is automatically returned to zero while making the latter part of each complete line of entries on the sheet at Figure 37, ready for computing the total of the next customer's checks.

This computing head E, it will be understood, is to be mounted in the casing 79 (which may be lengthened for the purpose), below the other computing heads, and to be similarly constructed and similarly operated: the carriage 155 of course, being lengthened or extended at bottom, and having a fifth lug 169 connected to a fifth rod 168 to operate the master wheel 59 within said fifth computing head. Said master wheel 59 is rotated by a pinion 54ª similar to 54, meshing with pinions similar to 55, 56, on the bottom of vertical drive shaft 49, which of course is suitably lengthened downwardly for this purpose. Addition or subtraction or silencing of the computing head E is controlled by a clutch splined on said shaft 49, like the clutch 57, and a lever 96ª similar to 96 operates this clutch, together with the companion clutch 92 on shaft 84; said lever being controlled by a follower 121 riding on a cam disk 118ª, fixed upon the bottom of cam-disk shaft 119, which is also suitably lengthened to carry the disk 118ª. In other words, Figure 4ª shows a set of five computing heads, which correspond in construction and operation and in every way with the computing heads seen at the other figures of the drawings. More than five may be employed in some cases.

*Operation of automatic adding, subtracting and silencing devices.*—When the customer's sheet is introduced into the typewriting machine, the five cam disks (Figure 4ª) stand in the positions shown at Figures 16 to 19ª, with all the followers 121 resting upon the middle or neutral levels 146 on the cam disks, so that no computation is done during the writing of the date in the first column at Figure 37. All of the second, third, fourth and fifth computing heads stand at zero. The first computing head A shows the balance held by the bank at the completion of the previous day's business.

The first amount written is that of the last balance of the customer, that is, his balance at the completion of the previous day's business, which amount may of course be readily secured from the bank's books. This amount is written in the second column at Figure 37, and while it is being written it is added upon the fourth computing head, D, as a preliminary step towards ascertaining the customer's present balance. Concomitantly, this amount is subtracted from the amount on the first computing head A. In other words, the amount of the customer's balance is borrowed from the general balance held by the bank, with the intent of restoring it after revision or correction, as may be determined after computation of the present day's dealings of such customer. Accordingly, the neutral surface 146 on the revolving cam disk 115 is succeeded by a low surface 147, so that as soon as the date has been written, the revolving disk carries the neutral surface 146 past the point of the follower 121, and the latter is dropped by its spring 124 onto the subtraction surface 147, and rests upon that surface during the writing of the number in the second column at Figure 37, so that subtraction is performed upon the first computing head A.

While this is being done, the nose of the follower 121, at Figure 19, is forced up by the cam surface 145ª on the revolving cam disk 118, and thereafter rides on the top level or surface 145 on said disk, thus shifting the clutch in the manner already described to cause the fourth computing head, D, to add the amount which is being written in the second column at Figure 37.

During this operation on the first and fourth computing heads, the second, third and fifth computing heads B, C, E, remain silent, the followers 121 still riding on the neutral surfaces 146 on the revolving cams 116, 117, 118ª, Figures 17, 18, 19ª.

At the completion of the writing of the amount of the old balance in said second column, the fourth computer D will show the amount that has been written, while the top computer will show the gross bank balance as temporarily reduced by a like amount.

There is then written in the third column at Figure 37, the total of the deposits made by the customer on the day given. This amount is added on the fourth computing head D, to the amount of the customer's last balance; the follower 121 at Figure 19 still riding on the elevated surface 145 on the revolving cam 118.

At the same time the follower 121 at Figure 17, which has just been forced up by cam 145ª at said figure, rides upon the top level 145, and holds the pair of clutches 57, 92, in position to cause the second adding head B, at Figures 2 and 4ª, to add the amount written in the third or deposit column at Figure 37.

Concomitantly the follower 121, at Figure 16, drops to the long middle level or surface 146 on the cam disk 115; the top computing head or totalizer A, remaining silenced until the final column is reached on sheet 148.

The followers 121, at Figures 18 and 19ª, still remain on the neutral levels 146. Thus, at the completion of the writing of the amount in the third column at Figure 37, said amount has been added upon the fourth totalizer D, and also upon the second totalizer B, which is intended to show the gross daily deposits.

The operator then writes the amounts of the individual checks to be charged against said customer, these preferably being written along the same line and in columns 4, 5, 6, 7 and 8 on sheet 148. During the writing of these checks, their amounts are subtracted upon the fourth or temporary computing head D, the follower 121 at Figure 19 having dropped to the bottom surface or level 147 at Figure 19, the amount of each check being therefore deducted, as it is written, from the total that is shown on this temporary computer D. While these amounts of these checks are being written, the follower 121 at Figure 18 is forced up by an inclined surface 145ª on the revolving cam 117, Figure 18, and caused to ride upon the top level 145 of said cam disk, so that the amounts of all the checks are accumulated on the third computing head or totalizer C, which is intended to show the gross daily withdrawal, that is, the total amounts of all the checks charged against all of the various customers of the bank.

At the same time, the follower 121, at Figure 19ª, is forced up by an inclined surface 145ª on the revolving cam 118ª; Figure 19ª, and caused to ride upon the top level 145 of said cam disk, to accumulate the amounts of the checks upon the fifth computing head E, so that the total of the checks may be ascertained. During this check-listing operation the followers 121, at Figures 16 and 17, ride upon the middle or neutral levels 146 of the revolving cams 115 and 116, so that the first and second computers A and B are silenced.

At the completion of this part of the operation, the first computer A remains unchanged, the second computer B also remains unchanged, the third computer C will show the total of the checks, the fourth computer D will show the amount of the customer's credit after offsetting the checks against the deposits and the prior balance, and the fifth computer E will show the total of this customer's checks.

The operator now proceeds to write, in the ninth column, Figure 37, the total of the checks that have been listed, which he reads from the fifth totalizer E.

At this time the follower 121, at Figure 19ª, is dropped by its spring onto the lowest level or surface 147 upon the revolving cam disk 118ª, so that the amount is subtracted from the fifth computer E, this operation leaving said computer at zero, ready for computing the total of the checks for the next customer.

At the same time all the remaining computing heads are silenced, each of the first four followers 121 riding upon the middle or neutral level 146 on its associated revolving cam; and at the conclusion of this part of the operation, the first four computers remain unchanged, the fifth computer showing zero.

The operator then writes in the final column the amount that shows on the fourth computer D, said amount being the balance of this customer. While this is being done, the amount is subtracted from said fourth totalizer D, and hence the same is returned to zero, ready for computation of the next customer's account; the follower 121, at Figure 19, riding for this purpose on the level 147 on the revolving cam 118.

At the same time this amount so written in the final column, at Figure 37, is added on the first computer A, so that at the end of the operation, said computer A shows the gross balance that the bank has on hand; the follower 121, at Figure 16, being lifted by a cam 145ª on the revolving disk 115 and riding upon the top level 145. During this operation the second, third and fifth computing heads remain silenced, their followers 121 resting on middle levels 146 on their respective cam disks.

At the conclusion of the entire operation, the first computing head A will show the gross balance, the second computing head B will show the gross deposits, the third computing head C will show the gross withdrawals, while the fourth and fifth computing heads D and E will stand at zero.

The operator then removes the sheet from the machine and puts in another sheet, to enter up the account of another customer; the operation proceeding in the manner already described; and at the conclusion of such operation the first computer A shows the gross general balance of the bank, the second computer B shows the total of all the deposits of the customers, the third computer C shows the total of all the checks of the customers, while the fourth and fifth computers D and E again stand at zero.

This operation is repeated with all the sheets 148. The following day the operation is repeated, with corresponding results, each sheet being re-inserted in the machine for this purpose, the computing heads B and C, however, having been returned to zero before the re-insertion of any sheets 148. Thus in a simple, inexpensive and accurate manner are kept the accounts of the bank with its customers.

It will be understood that there may be used in the typewriter a general record sheet, so that carbon copies may be made thereon of the several accounts as they are written upon the machine, said record sheet remaining in the machine while the individual sheets are successively inserted and withdrawn. This record sheet may, if desired, be in the form of a web or roll, which may be of sufficient length to show the entire day's transactions, and may be used as a reference, and for other purposes.

When only four of the computing heads and their appurtenances are employed, as at Figures 1, 2, and 16 to 19, the ninth column on the sheet, at Figure 37, which shows the totals of each customer's checks, may be omitted. It will also be understood that the computers may be employed in other ways, or for other uses, for different systems of bookkeeping and other purposes, the cam disks associated therewith being of course formed in each instance to meet the requirements. For instance, the first computer A, instead of being used for the general bank balance, may be used for totalizing each customer's checks, so that the ninth column at Figure 37 may be filled in.

When it is desired to dispense with the use of the cam disks 115 to 118ª, a lever 150 (Figures 1, 27, 29) is turned to rock a shaft 151, thereby turning downwardly a cam 152, which serves as a step upon which the vertical cam-carrying shaft 119 rests, so that said vertical shaft may drop until the five (or four) cam disks thereon are out of range of movement of the followers 121. The different computing heads may then be set by the levers 93 to 96ª, (which are provided with handles, as illustrated), to add or subtract or remain silenced, as may be required, so that the machine is adapted for not only the kind of work seen at Figure 37, but also for many other kinds of work.

At Figures 25 to 29, the lever detents 104 are shown as engageable with slots or seats 153ª in a vertical bar 153, the latter connected to the lever 150, to move from the silenced full-line position to the effective dotted-line position at Figure 29, when the cam-disk shaft 119 is dropped. The levers 93 to 96ª, (Figure 4ª), may then be adjusted independently of one another to cause any computing head to add, subtract, or remain silenced; the detent pin 104 on each lever being released by a handle 153ᵇ having a spring 153ᶜ, (Figures 26 and 29). The bar 153 is mounted at its top and bottom ends upon a pair of links 154, and by means of springs 154ᵃ is held back. An arm 154ᵇ, connected to lower link 154, bears against a cam 154ᶜ fixed upon the shaft 151. It will be seen at Figure 29, that the movement of the lever 150 in the direction of the arrow, will cause the projecting part 154ᵍ of said cam 154ᶜ, to press the arm 154ᵇ to the right. At the same time the lower link 154 swings to the right, and by means of an arm 154ᵈ, a link 154ᵉ and an arm 154ᶠ on the top link 154, the latter is caused to swing with a motion like that of the lower link 154, and hence the bar 153 is carried to the right. When the arm 150 is swung up again, said bar 153 is carried to the left, and the clutch levers may be automatically actuated by the cam disks, seen at Figures 1 and 16 to 24, without interference by reason of engagement of detents 104 with seats 153ᵃ in said bar 153. When the parts are in full-line position at Figure 29, it will be understood that the followers 121 and levers 93, etc., may be freely operated in one direction by the cam disks, and in the other direction by the springs 124.

*Master wheel carriage.*—All of the master wheels 59, which are rotated by the mechanism above described, are caused to move simultaneously step-by-step towards the right, from computing wheels of higher denomination to those of lower denomination, by means of a carriage 155, having upper rolls 156 to travel on a rail 157, and lower rolls 158 to travel on a rail 159; said rails joined at their inner ends to the typewriter frame 160, and at their outer ends connected by a vertical plate 161, which supports the principal members of the gearing seen at Figure 2, and also forms part of the casing 79 containing the computing heads; said casing also comprises a rear wall 162, a front wall 163 and side wall 164. Each master wheel has a head 165, which is circumferentially grooved at 166 to receive a coupling 167 projecting inwardly from a hollow mandrel or arbor 168 within which the master wheel shaft 50 telescopes; each of said arbors extending through the left-hand wall 164 of the casing, and at its outer end fixed in a boss 169, four of these bosses being secured one below the other upon the carriage 155, Figures 2, 7 and 11. In the form shown at Figure 4ᵃ, it will be understood that five bosses and arbors are mounted on the carriage 155, to feed five master wheels. When the carriage travels either to the left or to the right, the arbors 168, by means of their pins 167, cause the master wheels 59 to travel along the shafts 50 by which they are rotated and whereby they are caused to turn the computing wheels 62.

*Connection from master wheel carriage to typewriter carriage.*—The master wheel carriage 155 is connected to the typewriter carriage 7 in a manner to cause the master wheel to travel from left to right, or from higher to lower denomination, during the progress of the typewriter carriage in letter-feeding direction from right to left, so that the numbers to be written and calculated may be written in the natural way, beginning with the figure of highest denomination and proceeding to those of lower denomination.

The connection from the master wheel carriage 155 to the typewriter carriage 7 comprises an arm 170 on the former, Figures 2 and 11, a lever 171 loosely connected at 172 to said arm, a slide 173 to which said lever is loosely connected at 174, a hook 175 pivoted at 176 on said slide, and a collar 177 mounted upon a bar 178 which is supported upon a pair of arms 179 projecting forwardly from the carriage 7, (Figure 3). Said lever 171 is fulcrumed between its ends at 180 upon a support 181 connected to the framework of the machine, and causes the carriage 155 to move in the opposite direction from the carriage 7.

The slide 173 slides along a rail 182 fixed upon a bar 183 secured upon the framework 160 of the typewriting machine at the front thereof; said rail 182 being of T section and the slide clasping the same, as will be understood by reference to Figures 12 and 14. Each of the collars 177 carries a tooth, projection or lug 184, Figure 15, the hook 175 having a notch 185, Figure 13, to catch thereon, and being normally held up in engagement with the same by a compression spring 186.

*Automatic intermittent connection of master wheel carriage to typewriter carriage.*—As will be understood from the foregoing description, it is sometimes desired that computation shall be performed upon the same computing head at different portions of each line of writing, which line may of course take in all of the columns on the work sheet. It may be desired, for instance, to subtract the amounts written in the fourth, fifth, sixth, seventh and eighth columns from the sum of the amounts written in the second and third columns; the amount written and subtracted in one column being perhaps simultaneously added on another of the computing heads, and so on. The master wheel carriage may accordingly be caused to become automatically disconnected from the typewriter carriage at the completion of the writing of each number in its appropriate column, and then to return to position to begin computation of another number, while the latter is being written in a succeeding column; the master wheel carriage being for this purpose reconnected automatically to the typewriter carriage. Such disconnection and reconnection may occur many times during the writing of each line across the work sheet.

To effect such disconnection, an interceptor 187 projects from the bar 183 into the path of a cam 188 formed on the free end of the hook 175, so that when the master wheels have reached their extreme right-hand positions, the hook is cammed down and automatically disengaged from the tooth 184, and the master wheel carriage 155 is instantly returned towards the left, by means now to be described.

*Screw for driving master wheel carriage.*—Fitted to the free end of said hook at 189, is a tooth 190 (surrounded by the spring 186), having at its lower end one or more points 191 to engage the threads of a multiple quick-thread returning screw 192 (which is in constant rapid rotation in a direction to carry the tooth 191 to the right, Figure 11). It will be understood that 191 performs the function of a half-nut, and that in some cases a half-nut may be employed, in order to give more wearing surface upon the engaging parts.

To hold the tooth 191 down in engagement with the returning screw 192 against the tension of the spring 186, there is employed a spring latch 193, which catches over a lug 194 on the free end of the hook 175. As long as said latch is hooked over said lug 194, the screw 192 returns the slide 173 rapidly to the right, and in some instances until the tooth 191 runs off from the end of the screw.

Disengagement of said latch is effected by a cam 195, projecting towards the left from the succeeding collar 177. As the slide 173 moves to the right, forcing the latch 193 to impinge against the cam or interceptor 195, the latter trips the latch off from the lug 194, and the spring 186 instantly snaps the hook 175 up to engage the lug 184 on this collar 177, the carrying tooth 191 of course being lifted and released from the revolving screw 192. The typewriter carriage 7 is now reconnected to the master wheel carriage 155, so that a number may be written in the next column and also either added or subtracted on one or more of the computing heads.

The returning screw 192 may have a shaft 196, connected to the motor 34 by a train of gearing, comprising a pinion 197, a pinion 198 meshing therewith and fixed upon one end of a horizontal shaft 199, Figure 11, the latter carrying at its right-hand end a bevel pinion 200, which meshes with a bevel pinion 201 fixed upon the top of the vertical shaft 84. The latter is connected by shaft 87 and gears 88, 89 to the motor shaft 33.

A spring 202, Figure 11, may be coiled about the lever axis 180 to urge the slide 173 towards the right, so that if the carrying tooth 191 becomes disengaged before the notch 185 in the hook 175 registers with the lug 184 on the collar 177, the slide 173 will not lie dead, but will be moved along by said spring 202 far enough to enable the hook 175 to snap up into engagement with said lug 184. The portion of the hook bordering the notch 185 on its right hand side may be cut away, as at 203, so that engagement thereof with the under side of tooth 184 will not prevent the nose 204 of the hook from catching on 184. Owing to the weight of the carriage 155 and the parts connected therewith, the power-driven screw 192 for returning said carriage is an advantage, since if the spring alone were depended upon to move said carriage 155 with the desired speed, it would have to be so strong that in some cases it would prove an undue drag upon the movement of the typewriter carriage 7 in letter-feeding direction. Moreover, such a strong spring would be liable to give the heavy carriage 155 an undue impetus in some cases. The spring 202 may be relatively weak; the burden of moving the carriage 155 being principally borne by the power-driven screw 192, and the carriage 155 being driven thereby with substantially uniform speed.

If it be assumed that the paper-carriage 7 is moving in letter-space direction towards the left, at Figure 11, it will be seen that the tooth 184 on the third collar 177 on bar 178, which is engaged by the notch 185 in the hook 175, will drive said hook and slide 173 towards the left; the lever 171 moving the master-wheel carriage 155 towards the right. This continues until the cam 188 on the hook 175 engages the interceptor 187, thus depressing this end of the hook and drawing it down clear from the tooth 184, against the tension of spring 186.

It will be understood that said hook 175 disengages said tooth 184 before the tooth 191 engages the revolving screw 192. However, the hook 175 has descended far enough to enable the nose of latch 193 to catch over the lug 194 on the hook 175; and it will be seen at Figure 12, that the top of said lug 194 is beveled or cammed at 194ª, so that when the spring latch 193 presses rearwardly, it will act upon said cam surface 194ª, to depress it and force the hook 175 to swing down still further, to engage the tooth or point 191 with the screw 192, which (aided by spring 202) thereupon returns the slide 173 towards the right and the master-wheel carriage 155 towards the left, until the cam surface 195 on the succeeding cam 177 trips said latch 193 and releases the hook 175, so that it may be lifted by the spring 186 to catch upon the adjacent lug 184. The tripping of latch 193 from lug 194 is effected by reason of the movement of slide 173 towards the right, this movement being continued a little after release of 191 from 192, by reason of the impetus of the slide 173 and carriage 155, aided by spring 202, so that disconnection of 193 from 194 is assured.

After the hook 175 escapes from the last collar 177 on the bar 178, the screw 192 may carry the slide 173 to the right, until the point 191 is carried out of engagement with said screw. The hook 175 remains held down by the latch 193; but when the carriage 7 is returned to begin a new line, a cam surface $195^a$ on the first collar 177 engages the latch 193 to force the same to release the hook 175, as will be understood by reference to Figure $13^a$; the surface $195^a$ forming an angle with the cam 195; and the side of the latch being chamfered at $195^b$ to engage said surface $195^a$. The spring 186 then throws the hook 175 up, until it is arrested by pin $195^c$, working in a slot $195^d$ in a finger which extends up from the slide 173.

If the carriage 7 should be returned so slowly towards the beginning of a new line, that said spring 186 would cause the hook 175 to snap into engagement with the lug 184, said hook and slide 173 will be driven to the right, until a pin $204^a$ upon the hook 175, Figure 11, is engaged by a fixed cam or hook $204^b$, whereby the movable hook 175 is pulled down and released from the lug 184. The last described disengagement occurs after a leaf-spring $204^c$ on the right-hand end of the slide 173 has engaged a pin $204^d$ fixed upon the end of the slide track 182; and after such release of the hook 175, the reaction of said spring $204^c$ drives the slide 173 towards the left again, until the pin $204^a$ is released from the fixed cam or hook $204^b$.

It will be understood that each of the clutch-controlling cam disks 115 to $118^a$ may be divided in some cases into as many sections or cams as there are collars 177 on the bar 178, so as to cause its associated computing head to add, subtract, or remain silent, while the master-wheel carriage 155 is controlled by such collar. Or each cam disk may be provided with but two cams, and so on. In other words, the cam disks may be so formed and the blocks 177 may be so placed, as to co-operate in a manner to perform any one of many varieties of computations, and with a great choice of arrangement of columns on the work sheet. It will also be understood that each computing head may be silenced as to one or several of said collars 177, or may be active as to all of them, and may subtract in connection with some collars, and add in connection with others, dependent upon the sort of accounting to be performed.

It will also be perceived that by turning down the handle 150, the disks may all be silenced, and the computing heads may thereupon be controlled by the cams or levers 93, and the collars 177 may be adjusted wherever desired along the bar or rack 178, the latter having at frequent intervals threaded perforations 205 to receive binding screws 206 on the collars.

The collars 177 may be arranged to cause adding or subtraction to be done upon the computing heads at the intervals shown at Figure 37; in other words, the collars 177 may be located at intervals to correspond with the positions of the cams upon the several disks 115 to $118^a$, Figure $4^a$. If desired, the master-wheel carriage 155 may be operated by suitable means in place of that herein described. Said carriage 155 is intended to be connected to the typewriter carriage 7 for computation in the several columns at Figure 37, for instance, but whether addition or subtraction shall be performed upon any one or more of the computing heads, or whether any one or more of the computing heads shall remain silent in each column, is dependent upon the said revolving cam disks 115 to $118^a$. It will be understood that in writing the sheet shown at Figure 37, the typewriter carriage may run entirely across the first line, for instance, the master-wheel carriage 155 reciprocating at intervals determined by the location of the collars 177, so as to enable the desired kind of computation to be performed in the desired columns by the desired computing heads.

*Bichrome ribbon mechanism.*—As it is usually desired to typewrite credit columns in one color and debit columns in another color of ink, there is provided means for automatically shifting a bichrome ribbon on the typewriter to print either one or the other color in each column. Each type bar of the typewriter has a heel 208, which engages a universal bar 209 carried upon a frame 210, the latter supported at its forward end in a slot 211 in a type segment 212, and at its rear end upon idle links 213. This bar has a lug 214 to vibrate a dog rocker, pivoted at 215, and comprising a detent dog 216 and a feeding dog 217, the latter normally in engagement with an escapement wheel 218, which is connected to a pinion 219, which is in mesh with a rack 220 on the carriage 7, (which rack may be lifted up to release the carriage from the control of the described letter-feeding mechanism.)

Upon the universal bar frame 210 is a frame 221, upon which is carried a shiftable actuator 222, for engaging a lever 223, which is fulcrumed at 224 upon a bracket 225 fixed as usual upon the platen shift rail 226; said lever connected at its forward end to a vertical vibrator 227, upon the upper end of which is carried a bichrome ribbon 228, (Figure 3) wound upon spools 229. Upon said lever 223 (fulcrumed at 224) are pins 230, 231, projecting from its opposite sides at different elevations above its fulcrum. The actuator 222, which is shown at Figure 3 in engagement with the top pin 231, may be shifted to the right to release said pin to engage the lower pin 230 on the opposite side of the lever, as in the position shown at Figure 31. The upper pin being engaged by the slotted actuator 222, the lever is given a relatively short stroke, and hence the upper edge of the ribbon, which normally stands below the printing point, is brought up to be struck by the types. When the two-armed actuator or yoke 222 is shifted to the right at Figure 3, to release the pin 231 and engage the opposite pin 230, nearer the fulcrum of the lever, the latter is given a maximum vibration, and hence the lower edge of the ribbon is carried up to the printing point by the type strokes, said lower edge bearing a stripe of different color from the upper edge.

In the present instance, said shiftable actuator 222 is shifted by means of a train of mechanism comprising a link 232, an arm 233 pivoted at its upper end to said link at 234 and fixed at its lower end upon a horizontal rock shaft 235, which extends forwardly and carries near its forward end an upstanding arm 236, whereby the shaft is rocked automatically; said arm being connected by a link 237, Figures 5 and 31, to an arm 238 fixed upon a vertical rock shaft 239, the latter having a forward arm 240 to rest against an edge cam 241 fixed upon the revolving vertical shaft 119. A spring 242 caught upon a pin 243 on said link 237 causes said nose 240 to press against the cam 241.

The revolving cam 241 may have any desired shape, and may cause the follower 240 to vibrate as many times as there are columns on the work sheet, or may cause only a single vibration at each complete line of writing, or otherwise operate, according to the necessities of the work to be done. When said nose 240 is riding on that part of the periphery of the cam which is most remote from the shaft 119, as at Figure 31, the shiftable actuator 222 is drawn to the left, and the lower pin 230 is engaged thereby, and the lever 223 given a maximum stroke, so that lower color stripe 244 is caused to cover the printing point. But when said nose 240 is riding on that part of the periphery of the cam which is nearest the shaft 119, the spring 242 holds the parts 236 and others, including the actuator 222, in position to operate the lever 223 by means of the upper pin 231, so that the stroke of the lever 223 is minimized, and hence the upper color stripe 245 of the ribbon is caused to cover the printing point at the type strokes.

The described train of ribbon-shifting mechanism is operated in one direction by the cam 241, and in the other direction by the spring 242, as will be understood.

When the shaft 119 is dropped, to silence all the revolving cams thereon, the follower 240 runs off from the cam 241, and rests idly upon a cylindrical surface 246, of the same diameter as the depressed portion of the cam 241, so that the spring 242, Figure 31, holds the ribbon-shifting mechanism in position to write upon the upper stripe 245 which is usually black.

At any time a handle 247, fixed upon the front end of the rock shaft 235, may be employed to turn said shaft to shift the ribbon-shifting mechanism to position for writing on the lower stripe 244, which is usually red. Said handle has a yielding detent 247ª to engage a suitable depression in the framework. The handle 247 has a hub 248, loose upon a boss 249, the latter fixed to the rock shaft 235 by a screw 249ª, the head of which projects into a peripheral slot 248ª in the hub 248. The slot 248ª permits movement of the screw head 249ª to be effected by the cam 241, without disturbing the handle 247; and the latter may be turned when required, to operate the rock shaft 235 by means of said screw-head or projection 249ª.

When the shaft 119 is lifted again to restore the cams thereon to effective position, the follower 240 may be forced outwardly by a beveled surface 246ª formed between the cylindrical surface 246 and the cam 241, until said follower rests upon said cam 241.

At Figure 37, the fourth to the eighth columns are written in red, the red figures being indicated by underscores and the color usually indicating debits or withdrawals. In the first and last columns at Figure 37, certain numbers (showing debits or amounts overdrawn) are indicated in red; the handle 247 having been shifted temporarily to enable these numbers to be written through the red color stripe 244.

*Decimal tabulating.*—Along the front of the typewriter frame extends a row of decimal tabulating keys 250, which are carried upon levers 251, each pivoted between its ends at 252, and at its rear end having a knuckle joint 253 with an upstanding rod 254. Upon the typewriter carriage 7 is supported, in the usual manner, a rack 256, along which are adjusted column stops 257, whose arrangement at Figure 3 corresponds to that of the collars 177 at the front of the paper carriage. Another arrangement is shown at Figure 5, which corresponds to the arrangement of columns at Figure 37, and to the arrangement of cams on the disks 115 to 118ª, and it will be understood that the collars 177 may be given a corresponding arrangement. It will be understood that the notches on the rack 256 are at letter-space intervals as usual, and that the holes 205 on the rack 178, at the front of the machine, may also be at letter-space intervals. When any decimal tabulating key 250 is depressed, its lever is vibrated, the stop rod 254 is raised, and the stop 255, at the top thereof, is lifted into position to engage the succeeding column stops 257. At the same time, the carriage is released in the usual manner from the control of its letter-feeding mechanism; a lug 258 on each of the stop rods being capable of lifting a universal bar 259, and depressing a lever 260, thereby pulling down a link 261, Figure 34, and vibrating a lever 262, fulcrumed at 263 and carrying a roller 265, which underlies the rack 220, so as to lift the rack 220 from the pinion 219. Upon the relief of the key 250 from pressure, the parts are returned to normal positions, as usual, the rack 220 re-engages with the pinion 219, and the projected stop 255 is pulled down by a spring 265 to a normal position; and the key 250 also rises to normal position.

*Carriage-driving mechanism.*—The shaft 33 of the motor 34 is prolonged rearwardly, as shown at Figure 1, and carries the clutch arms 266, like the arms 35 and working in a drum 267, like the drum 36, thereby frictionally driving a bevel pinion 268, which meshes with a bevel pinion 269, (Figures 1, 3 and 5), the latter fixed on one end of a horizontal shaft 270 below the shaft 135, and carrying at its other end a bevel pinion 271, which by means of bevel pinions 272 and 273 and clutch 274, is capable of rotating the vertical shaft 138 (upon which is fixed the pinion 139, meshing with the rack 140 on the carriage 7) in either direction; the pinions 272, 273 being both loose on said vertical shaft 138, and a clutch 274 splined to said shaft at 275 and being movable up to unclutch 272 and clutch 273 to said shaft 138. Normally, the clutch is in position at Figure 5, with the pinion 272 clutched to the vertical shaft 138, for driving the paper carriage in letter-feeding direction; the friction clutch 266, 267 producing a constant torque on the shaft 138.

*Back tabulating.*—By depressing a key 280 at the keyboard, the carriage-driving clutch 274 may be indirectly caused to shift up, so as to connect the pinion 273 to the shaft and cause the carriage to be driven backwardly, or in a direction reverse to the letter-feeding direction. This key 280 is fixed upon a lever 281, pivoted at 282 on the framework, and connected by a rearwardly extending link 283 to a bell crank 284, 285 at the rear of the machine; so that depression of the key thrusts the link 283 back and lifts the arm 285 of said bell crank. Said arm 285 is connected by a vertical link 286 with an arm 287, which is fixed upon a rock shaft 288 journaled in the framework of the machine, Figures 1, 5, 30, 36.

The function of said rock shaft 288 is to move to effective position a normally silenced horizontal universal bar 289, which extends across the system of vertical stop-rods 254, and is movable by arms 290 on said rock shaft downwardly and rearwardly into position over a set of shoulders or lugs 291 on the several stop-rods 254, so as to be lifted thereby at every depression of a decimal tabulating key 250.

Said universal bar or rod 289 extends loosely through curved guiding slots 292 in a pair of arms 293, having a returning compression spring 324, pivoted each between its ends at 294 to the framework and rigidly connected at their rear ends by a tie rod 295, so as to form a swinging frame. The arms 290 have slots 296 through which the universal bar 289 passes. The slots 296 and 292 permit the necessary movements of the bar. When key 280 is depressed, and the link 283 thrust back, and the bell crank 284, 285 and the vertical link 286 are operated to swing the rock shaft 288 and arms 290, the universal bar 289 is swung downwardly along the slots 292 to a position above the shoulders 291, so that any of the latter, when rising may lift the universal bar and swing the frame 293.

A link 297, attached to one of the arms 293, swings a lever 298, which has a pin 299 engaging a peripheral groove 300 in the clutch 274, to lift the clutch to engage pinion 273, so that a reverse torque is put upon the carriage driving shaft 138, causing the latter to urge the carriage 7 backwardly.

It is usual in typewriting machines (including the Underwood front strike writing machine, to which the present improvements are shown applied), for the carriage to be freely movable in backward direction; the escapement wheel 218 in said machine being for this purpose made loose on its shaft, and provided with one or more pawls 301 to engage the teeth of the escapement pinion 219, to permit the latter to be rotated backward freely or independently of the escapement wheel 218. It is also apparent that the shoulders 258 on the stop rods will operate to release the rack 220 from said pinion 219 when back tabulating is being performed, as well as for ordinary forward tabulating; although, owing to the provision of the pawl 301, it is not essential that the rack 220 be released for back tabulating.

It will be understood that the pinions 272, 273, have internal clutch teeth, to match upper and lower teeth on the double clutch 274; the construction being the same as for various clutches of the computing devices seen at Figure 1, and illustrated in certain of my pending applications; this being a common style of clutch.

It will be seen from the foregoing that the depression of the key 280 does not at once reverse the torque on the carriage driving shaft 138, but enables any of the tabulating keys 250 to do so.

The key 280 may be held down by a latch-lever 302, the latter having a notch 303 to engage a pin 304 on the key lever 281, a spring 305 operating the latch. To release the key 280, it is only necessary to pull the lever 302 forward.

The column stops 257, which are two-pronged as usual, to fit in the upper and lower teeth of the rack bar 256, are each thinner than the width of a letter space, and each serves for backward as well as for forward tabulating.

When any column stop 257 arrests the backwardly driven carriage, the latter (upon the release of the key 250) comes to rest at a point which is one letter-space subsequent to or following the point at which the carriage is arrested by the same stop in forward tabulating; this difference in the position of the arrested carriage being due to the fact that the decimal stop 255 engages the column stop upon its opposite side while tabulating backwardly. In order to avoid error from this source, each tabulator key is provided with a suitable designation for forward tabulating shown by black letters on white ground at Figure 3, and also with a suitable designation for back tabulating, shown by white letters on black ground at said figure. For instance, one of said keys carries the designation "10" and "1"; and in forward tabulating, when said key is depressed, it will cause the carriage to stop in a position to begin the writing and adding of a number in the tens column; whereas if the same key is depressed for back tabulating, it will cause the carriage to stop in position for beginning the writing and adding of a number in the units column.

*Line-spacing mechanism.*—Since the back-tabulating operation is employed to bring the carriage 7 back to position to begin the writing on a new line, mechanism is provided for also automatically line-spacing the paper when back-tabulating, so that all the operator needs to do is to depress the selected back tabulator key, and then begin writing a new number.

The line-spacing mechanism comprises a vertical link 310, pivoted at its lower end to the tie-rod 295, and pivoted at its upper end at 311 to an arm 312, extending rearwardly from a horizontal rock shaft 313 and extending parallel with the carriage guide-rail 8 and journaled at its ends in brackets 314 upon the carriage 7. Said arm 312 is splined to said rock shaft 313, having a key 315 fitting a longitudinal groove 316 in said shaft, so as to rock the latter at all points in the carriage travel. At one end, said shaft 313 carries an arm 317, which is connected by means of a link 318 to an arm 319, loose upon the platen axle 320 and having a pawl 321 to engage a ratchet 322 connected to the rotary platen 6, said pawl having a returning-spring 323. Any suitable line-spacing pawl may be employed, as for instance, one of the usual variety, which normally stands out of engagement with the ratchet wheel; and the ordinary Underwood hand-operated line-spacing devices may also be employed in connection with the automatic line-spacing devices herein shown.

It will be seen that if any of the keys 250 is depressed for back tabulating, the shoulder 291 on the associated decimal stop rod 254 lifts the universal bar 289, rocks the frame 293, 295, pulls down the link 310, rocks the shaft 313, presses the link 318 forwardly, and by means of the pawl 321 rotates the platen for line-spacing. Upon relief of the key from pressure, it is returned by springs 265, and the compression spring 324 returns the parts 293, 295 310, 313, 318, etc., to normal positions.

It will be seen that during both the forward and backward tabulating operations, the computing carriage 155 may be positively connected by the hook 175 to the typewriter carriage 7, so as to be driven positively in each direction thereby. The back tabulating mechanism is of special value when the checks are to be listed in a single column, instead of being run across one or more long horizontal lines as at Figure 37; the operation in the former case being to write these balances, deposits, total checks, and final balances in the same manner as at Figure 37, but to write each of these checks in a single vertical column, each of such columns being preferably headed by the date.

The back tabulator is also useful in writing a list of checks in the deposit column, when required. It will also be understood that the back tabulator may be employed in computing machines alone, or in typewriting machines alone, if desired, particularly in connection with a constant-torque reversible carriage-driving shaft.

The collars or blocks 177 at the front of the carriage may be set in relation to correspond to the column stops 257 at the back of the carriage; and it will be understood that the blocks 177 should be so fixed that the pin 187 will drop off the hook 175 to letter-space after the completion of each amount seen at Figure 37, that is to move an extra letter-space after the completion of the writing of the amounts in the cents column. This arrangement permits the use of the back tabulator for listing the checks in a single vertical column, without liability of disconnection of the hook 175 during the writing of the single column line by line.

*Special carriage-return key.*—A special key 330, upon the front end of a lever 331, is used for returning the carriage to the extreme movement of its right-hand travel, independently of the decimal stops and without the necessity of first depressing the key 280, so as to return the carriage to position to begin a new line of writing, whether or not computing is to be performed during the writing of such line. Said key lever 331 is similar to the levers 251, and similarly mounted, and at its rear end is connected to the lower end of a special vertical rod 332, which at its top is guided in a rack 333 like the column-stop rods, but which itself carries no stop, but is cut off so as not to be able to reach the column-stops 257, as seen best at Figure 30. Said rod 332 need not have the lug 258 that actuates the carriage-releasing bar 259.

To the lever 331, near its forward end, is connected a link 334, which is pivoted at its upper end to a member 335, the latter fulcrumed at 336, upon the side wall of the machine base, and comprising a cam edge 337 to engage a pin 338 projecting laterally from the link 283. Therefore, when the lever 331 is pulled down, the cam 337 presses said link 383 rearwardly, with the result that the special universal bar 289 is swung to position to be engaged by the shoulder 291 on the special vertical rod 332, so that the upward movement of the latter, as at Figure 34, may operate the frame 293 and cause the carriage-reversing clutch 274 to rise and reverse the torque upon the carriage-driving shaft 138. The key 330 is held down until the carriage reaches the extreme right-hand limit of its movement, whereupon the key is released, and spring 265 connected to the vertical rod 332, returns the parts to normal position.

The described rearward movement of link 283 does not disturb the key 280 said link being loosely connected to said key by means of a slot 340 in the link and a pin 341 on the key lever.

It will be seen at Figures 30 and 34, that the knuckle joint 339 between the lever 331 and the rod 332 is loosely formed, to permit the lever 331 to move idly to operate the cam 337 fully before the rod 332 is lifted, the latter slotted and normally resting on pin 332ª, Figure 30.

It will also be seen that the movement of the universal bar 289 effected by the carriage return key 330 causes the described automatic line-feeding mechanism to operate to turn the paper a line-space for beginning a new line of writing.

It will be observed that the motor 34 need not be powerful, notwithstanding the great amount of work it has to do, since it is employed at one time for turning the computing wheels, at another for driving the carriage 7 forwardly or backwardly, and at another time for driving back the carriage 155. Hence a relatively small and compact motor will be found ample for the purpose.

Variations may be resorted to within the scope of the invention, and portions of the improvement may be used without others.

Having thus described my invention, I claim:

1. The combination with a key-controlled drive shaft, of a pinion thereon, a master wheel, computing devices operated by said master wheel, a pinion connected to said master wheel, a lever, shiftable means operated by said lever either to enable said pinions to co-operate to drive said master wheel or to silence said pinions, a slide having means to lock one of said pinions when silenced, a guide for said slide and means to enable said lever to operate said slide.

2. The combination with a key-controlled drive shaft, of a pair of pinions loose thereon, a master wheel, computing devices operated by said master wheel, a third pinion connected to said master wheel, a clutch splined on said drive shaft, a lever to shift said clutch along said shaft, means to enable said clutch to connect either of said drive pinions to said shaft, said clutch being shiftable by said lever to a position to silence said drive pinions by disconnecting them both from said shaft, means operated by said lever to lock said pinions when silenced, and means for guiding said locking means.

3. The combination with a key-controlled drive shaft, of a pair of pinions loose thereon, a master wheel, computing devices operated by said master wheel, a third pinion connected to said master wheel, a clutch splined on said drive shaft, a lever to shift said clutch along said shaft, means to enable said clutch to connect either of said drive pinions to said shaft, said clutch being shiftable by said lever to a position to silence said drive pinions by disconnecting them both from said shaft, means operated by said lever to lock said pinions when silenced, and means for guiding said locking means, said locking means comprising a slide having locking teeth, and each of said drive pinions having a locking pinion to be engaged by said teeth.

4. The combination with a key controlled drive shaft, of a pair of pinions loose thereon, a master wheel, computing devices operated by said master wheel, a third pinion connected to said master wheel, a clutch splined on said drive shaft, a lever to shift said clutch along said shaft, means to enable said clutch to connect either of said drive pinions to said shaft, said clutch being shiftable by said lever to a position to silence said drive pinions by disconnecting them both from said shaft, means operated by said lever to lock said pinions when silenced, and means for guiding said locking means, said locking means comprising a slide having a locking tooth, and one of said drive pinions having a locking pinion to be engaged by said locking teeth.

5. The combination of a drive shaft connected to a source of power, a key-controlled escapement-wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding typewriter carriage, means connected to said letter-feeding carriage for shifting said clutches; said shifting means including cams connected to said carriage to rotate as the latter travels, followers for said cams, and connections from said followers to said clutch connections.

6. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding typewriter carriage, and means connected to said letter-feeding carriage for shifting said clutches; said shifting means including cams connected to said carriage to rotate as the latter travels, followers for said cams, and connections from said followers to said clutch connections, said clutch-controlling means including means for silencing certain of said master wheels.

7. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, and means operated by said followers to shift said clutch connections.

8. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, and means operated by said followers to shift said clutch connections; each follower having a spring to hold it down upon its cam disk.

9. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, and means operated by said followers to shift said clutch connections; said cam shaft connected to a rack on said carriage by a train of gearing so proportioned that the shaft makes about one complete revolution while the carriage is moving from one limit of its travel to the other.

10. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, and means operated by said followers to shift said clutch connections; each of said cam disks comprising a succession of cams for shifting the clutch connections, said cams having dead surfaces for holding the clutch connections in the positions to which they are shifted.

11. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, means operated by said followers to shift said clutch connections; each of said cam disks comprising a succession of cams for shifting the clutch connections, said cams having dead surfaces for holding the clutch connections in the positions to which they are shifted; said cam disks also including cams for moving said clutches to silencing or dead positions, and dwell surfaces for holding said clutches in such positions.

12. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, means operated by said followers to shift said clutch connections; each of said cam disks comprising a succession of cams for shifting the clutch connections, said cams having dead surfaces for holding the clutch connections in the positions to which they are shifted; said cam disks also including cams for moving said clutches to silencing or dead positions, and dwell surfaces for holding said clutches in such positions; said cam disks differing one from another to cause certain of said master wheels to add while certain of said master wheels subtract and certain of said master wheels are silenced.

13. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, means operated by said followers to shift said clutch connections; a step upon which said shaft is supported, and means to shift said step to cause the shifting of said shaft endwise to bring the cam disks thereon out of range of the followers; said clutch connections being normally shiftable independently of one another.

14. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, means operated by said followers to shift said clutch connections, a step upon which said shaft is supported, and means to shift said step to cause the shifting of said shaft endwise to bring the cam disks thereon out of range of the followers; said clutch connections being normally shiftable independently of one another, springs for causing said followers to engage said cam disks, and a rack normally in idle position but movable by said step-shifting means to effective position, to serve for holding the several clutch-controlling levers in either adding, subtracting or neutral positions, each of said levers having a movable or yielding part to engage notches or seats in the rack.

15. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, means operated by said followers to shift said clutch connections, a step upon which said shaft is supported, means to shift said step to cause the shifting of said shaft endwise to bring the cam disks thereon out of range of the followers; said clutch connections being normally shiftable independently of one another, springs for causing said followers to engage said cam disks, a rack normally in idle position but movable by said step-shifting means to effective position, to serve for holding the several clutch-controlling levers in either adding, subtracting or neutral positions, each of said levers having a movable or yielding part to engage notches or seats in the rack, a guide link being provided to support said rack by its ends, a spring to hold said rack in normal position, and a cam operated by said shifting lever to move said rack and lock it in effective position.

16. The combination of a computing head, a carriage, a cam moving therewith to shift the computing-head to add, subtract, or remain silenced, means for freeing the computing-head from the control of said cam when the latter is moved out of working position, a lever for controlling said computing head, and a stop to hold the lever where adjusted, said stop movable into effective position when the cam moves out of effective position.

17. In combination a plurality of fixed computing-heads mounted one below another, a letter-feeding typewriter carriage, master wheels traveling step-by-step with said carriage, and means controlled by the carriage for causing each computing-head either to add or subtract or to remain silenced at different points in the line of writing.

18. The combination with a typewriter carriage, of a plurality of computing devices, each including a computing head and a master wheel therefor, mechanism for simultaneously operatively connecting with and disconnecting from said carriage all of said computing devices, and carriage controlled means for governing the state of said computing devices as to adding, subtracting and remaining neutral.

19. The combination of a plurality of computing heads, key-controlled means for effecting computing upon said heads simultaneously, a step-by-step feeding carriage, means to connect certain members of said computing heads to said carriage for a step-by-step feeding movement and for automatically disconnecting and automatically reconnecting them to said carriage at successive intervals in a single line of writing, to enable computation to be done simultaneously on each of said computing heads at each of several column fields on the typewriter carriage, and means controlled by the typewriter carriage for causing addition to be performed upon certain of said computing heads while subtraction is performed upon certain other of said computing heads.

20. The combination of a plurality of computing heads, key-controlled means for effecting computing upon said heads simultaneously, a step-by-step feeding carriage, means to connect certain members of said computing heads to said carriage for a step-by-step feeding movement and for automatically disconnecting and automatically reconnecting them to said carriage at successive intervals in a single line of writing, to enable computation to be done simultaneously on each of said computing heads at each of several column fields on the typewriter carriage, and means controlled by the typewriter carriage for causing addition to be performed upon certain of said computing heads while subtraction is performed upon certain other of said computing heads, said means being varied at different points in a line of writing to cause changes in the work done by the several computing heads from addition to subtraction or vice versa.

21. The combination of a plurality of computing heads, key-controlled means for effecting computing upon said heads simultaneously, a step-by-step feeding carriage, means to connect certain members of said computing heads to said carriage for a step-by-step feeding movement and for automatically disconnecting and automatically reconnecting them to said carriage at successive intervals in a single line of writing, to enable computation to be done simultaneously on each of said computing heads at each of several column fields on the typewriter carriage, means controlled by the typewriter carriage for causing addition to be performed upon certain of said computing heads while subtraction is performed upon certain other of said computing heads, said means being varied at different points in a line of writing to cause changes in the work done by the several computing heads from addition to subtraction or vice versa, and means being also controlled by the carriage for causing certain of said computing heads to be silenced at certain column fields and to compute at other column fields.

22. The combination with typewriting mechanism, including a carriage, for writing numbers aligned in cross columns extending across the sheet being written upon, of a computing device for adding certain of said numbers crosswise, a computing device for adding others of said numbers intermediate said certain numbers crosswise, a computing device for striking an individual balance by subtraction between said certain numbers and said other numbers in each cross column, a computing device for striking a gross balance by subtraction between all of said certain numbers and all of the other numbers, a single master wheel for each of said computing devices, means for intermittently and repeatedly connecting each master wheel to travel step by step with said typewriter carriage at each traverse thereof, and means for controlling said computing devices from said typewriting mechanism.

23. The combination of a typewriter carriage having a succession of lugs, a computing device, means, including a catch, to connect said computing device to said carriage by means of one of said lugs, a constantly revolving screw, means for automatically disconnecting said catch from said carriage and connecting said computing device to said screw for a return movement of the former, and means for disconnecting the computing device from the screw and engaging said catch with the succeeding lug on said carriage.

24. The combination with a typewriter carriage, of a plurality of computing devices, a second carriage connected to said computing devices for moving the same from denomination to denomination, means to connect said second carriage to the typewriter carriage, a constantly revolving screw or device, means for disconnecting said second carriage from the typewriter carriage and connecting it to said screw for returning the second carriage, and means for disconnecting the second carriage from the screw and reconnecting it to the typewriter carriage.

25. The combination of a typewriter carriage having a succession of adjustable lugs, a computing device, a second carriage connected to said computing device for moving the same from denomination to denomination, a slide, a lever connecting said slide to said second carriage to cause them to move in opposite directions, a hook upon said slide for engagement with the lugs on the said carriage, a tooth carried by said hook but normally idle, a multiple quick thread returning-screw, means constantly revolving said screw, a cam to disengage said hook from the carriage lugs and to press said tooth into engagement with said screw, a latch to hold said tooth in engagement with said screw, said lugs provided with latch-releasing arms, and a spring to disengage said tooth from said screw and to connect said hook to a succeeding lug on said carriage.

26. The combination of a typewriter carriage having a succession of adjustable lugs, a computing device, a second carriage connected to said computing device for moving the same from denomination to denomination, a slide, a lever connecting said slide to said second carriage to cause them to move in opposite directions, a hook upon said slide for engagement with the lugs on the said carriage, a tooth carried by said hook but normally idle, a multiple quick thread returning-screw, means constantly revolving said screw, a cam to disengage said hook from the carriage lugs and to press said tooth into engagement with said screw, a latch to hold said tooth in engagement with said screw, said keys provided with latch-releasing means, a spring to disengage said tooth from said screw and to connect said hook to a succeeding lug on said carriage, and a spring tending to move said slide in the same direction as it is moved by said screw.

27. The combination of a typewriter carriage having a succession of adjustable lugs, a computing device, a second carriage connected to said computing device for moving the same from denomination to denomination, a slide, a lever connecting said slide to said second carriage to cause them to move in opposite directions, a hook upon said slide for engagement with the lugs on the said carriage, a tooth carried by said hook but normally idle, a multiple quick thread returning-screw, means constantly revolving said screw, a cam to disengage said hook from the carriage lugs and to press said tooth into engagement with said screw, a latch to hold said tooth in engagement with said screw, said lugs provided with latch-releasing means, a spring to disengage said tooth from said screw and to connect said hook to a succeeding lug on said carriage, a constantly revolving motor, means to enable said motor to operate said computing device, a set of numeral keys, an escapement device for enabling said keys to control the movements of said computing device effected by said motor, and a connection from said constantly revolving motor to said returning-screw.

28. The combination of a typewriter carriage having a succession of adjustable lugs, a computing device, a second carriage connected to said computing device for moving the same from denomination to denomination, a slide, a lever connecting said slide to said second carriage to cause them to move in opposite directions, a hook upon said slide for engagement with the lugs on the said carriage, a tooth or nut carried by said hook but normally idle, a returning-screw, means constantly revolving said screw, a cam to disengage said hook from the carriage lugs and to press said tooth into engagement with said screw, a latch to hold said tooth or nut in engagement with said screw, latch-releasing means on said lugs, a spring to disengage said tooth from said screw and to connect said hook to a succeeding lug on said carriage, a constantly revolving motor, means to enable said motor to operate said computing device, a set of numeral keys, an escapement device for enabling said keys to control the movements of said computing device effected by said motor, a tens-carrying shaft connected to said motor to be constantly revolved thereby, and a connection ramifying from said tens-carrying shaft to said returning-screw to keep the latter constantly revolving.

29. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding typewriter carriage, means connected to said letter-feeding carriage for shifting said clutches; said shifting means including cams connected to said carriage to rotate as the latter travels, followers for said cams, connections from said followers to said clutch connections, and a second carriage connected to said master wheels, and means for connecting said second carriage to said typewriter carriage and disconnecting it therefrom and reconnecting it thereto at predetermined intervals in the travel of the typewriter carriage, to correspond with the disposition of said clutch-shifting cams, so that when said second carriage is working in each predetermined column field, the corresponding cams are effective to control the movements or silencing of the various master wheels, as required.

30. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding typewriter carriage, means connected to said letter-feeding carriage for shifting said clutches; said shifting means including cams connected to said carriage to rotate as the latter travels, followers for said cams, connections from said followers to said clutch connections, a second carriage connected to said master wheels, means for connecting said second carriage to said typewriter carriage and disconnecting it therefrom and reconnecting it thereto at predetermined intervals in the travel of the typewriter carriage, to correspond with the disposition of said clutch-shifting cams, so that when said second carriage is working in each predetermined column field, the corresponding cams are effective to control the movements or silencing of the various master wheels, as required; and means for silencing said cams and simultaneously enabling the clutches to be detained by other means in any of the three positions required.

31. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding carriage, a shaft, a series of cam disks fixed upon said shaft, connections from said shaft to said carriage to cause the shaft to turn as the carriage travels, followers to engage said cam disks, one for each disk, means operated by said followers to shift said clutch connections, a bichrome ribbon mechanism, and means upon said shaft to shift said ribbon mechanism from one color to another.

32. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding typewriter carriage, means connected to said letter-feeding carriage for shifting said clutches; said shifting means including cams connected to said carriage to rotate as the latter travels, followers for said cams, connections from said followers to said clutch connections, and a bichrome ribbon mechanism also under control of said carriage.

33. The combination of a letter-feeding typewriter carriage, type-operating numeral keys, means for vibrating a ribbon to cover the printing point at every key stroke, shiftable devices for causing either one or another color stripe of the ribbon to cover the printing point at the key strokes, a source of power, a key-controlled escapement wheel connected thereto, a computing head, a master wheel to operate the same, means controlled by said carriage to cause either addition or subtraction to be performed upon said computing head, and means also controlled by said carriage for concomitantly shifting said shiftable devices.

34. The combination of a drive shaft connected to a source of power, a key-controlled escapement wheel for controlling the movements of said drive shaft, a series of master wheels, computing devices operated by said master wheels, independent clutch connections between said master wheels and said drive shaft to enable the same to drive certain of said master wheels in one direction while driving certain of said master wheels in the opposite direction, a letter-feeding typewriter carriage, means connected to said letter-feeding carriage for shifting said clutches; said shifting means including cams connected to said carriage to rotate as the latter travels, followers for said cams, connections from said followers to said clutch connections, a shaft upon which said cams are mounted, a ribbon actuator 222, a link 232, an arm 233, a link 234, a rock shaft 235 carrying an arm 236, a link 237, an arm 238, a rock shaft 239 having an arm 240, and a cam 241 fixed upon said vertical shaft, means being provided to cause the arm 240 to rest against said cam, to enable the latter to shift said actuator 222, and give the ribbon-vibrating lever 233 either a maximum or minimum stroke.

35. In a combined typewriting and computing machine, the combination with a letter-feeding carriage and type-operating numeral keys, of a constantly revolving motor, an escapement wheel controlled by said numeral keys, a clutch between said motor and said escapement wheel, computing devices operable by said motor through said clutch and controlled by said escapement wheel, and a train of gearing extending from said motor to said carriage to drive the latter and including a second clutch.

36. The combination with a typewriter carriage, of computing devices including a separate carriage, means connecting said carriages, a constantly revolving motor, means connecting said motor to said carriages, said connecting means including a friction clutch, key-controlled letter-feeding mechanism for said carriages, a reversing gear between said friction clutch and said carriages, and a tabulating key having means to reverse said reversing gear.

37. In a typewriting machine, the combination of a letter-feeding typewriter carriage, a computing carriage connected thereto, a constantly revolving motor, means connecting said motor to said carriages, said connecting means including a friction clutch and also including a reversible clutch, a key for returning the carriages to the beginning of a new line of writing, said key having means for operating said reversible clutch, and a line-feeding mechanism also operable by said key.

38. In a computing machine, the combination with a computing carriage, of a set of decimal tabulating keys, decimal stops connected thereto, column stops, means driving the carriage in letter-feeding direction, and key-controlled means for enabling any of said decimal keys to cause the carriage to be driven in the opposite direction, and to enable said decimal stops and said column stops to arrest the return movement of the carriage; said carriage having a series of computing heads or devices, and means for concomitantly adding and subtracting upon different computing heads.

39. The combination with typewriting mechanism for writing numbers alinged in cross columns extending across the sheet being written upon, of a computing device for adding certain of said numbers crosswise, a computing device for adding others of said members intermediate said certain numbers crosswise, a computing device for striking an individual balance by subtraction between said certain numbers and said other members in each cross column, a computing device for striking a gross balance by substraction between all of said certain numbers and all of the other numbers, and automatic and manual means for selectively controlling the state of said computing devices at will as to adding, subtracting and remaining neutral.

40. The combination with typewriting mechanism including a carriage for writing numbers aligned in cross columns, of a computing device for adding certain of said numbers crosswise, a computing device for adding separately others of said numbers crosswise, a computing device for striking an individual balance by subtraction between said certain numbers and said other numbers in each cross column. a computing device for striking a gross balance by subtraction between all of said certain numbers and all of said other numbers, carriage controlled means for governing the state of all of said computing devices as to adding, subtracting and remaining neutral, manual means for so controlling said devices, and connections for silencing said carriage control.

41. In a combined typewriting and computing machine, the combination with a series of numeral keys and a traveling carriage, of a fixed computing device for calculating credit items, a fixed computing device for calculating debit items, a fixed computing device for calculating minor balances between said credit items and said debit items, a fixed computing device for calculating the gross balance between said credit items and said debit items, connections enabling said keys to control the operation of all of said computing devices, and connections from said carriage to cause the carriage to determine how and when said computing devices shall compute.

42. The combination with a typewriting mechanism including a traveling carriage, of a computing mechanism, controlling mechanism settable by hand or operated by said carriage for determining the state of said computing mechanism as to adding, subtracting and remaining passive, and means for making said carriage control effective or ineffective.

43. The combination with a computing head having a rotatable master wheel for controlling the operation of the same, of a power drive for said master wheel, a master-wheel-reversing device, a tens-carrying mechanism for said computing head, a power drive therefor, a tens-carrying reversing device, and an automatic control to operate both of said reversing devices concomitantly.

44. The combination with a computing head having a master wheel and carry over devices, of a clutch controlling the rotation and direction of rotation of said master wheel, a tens-carrying mechanism comprising parts required to be reversed to make it effective in opposite directions, and an automatic control for shifting said clutch and said tens-carrying mechanism.

45. The combination with a typewriting mechanism including a carriage, of a computing mechanism including a master wheel, a clutch controlling the rotation and direction of rotation of said master wheel, an automatic control for shifting said clutch, said automatic control being actuated from said carriage, a manual control, and means for rendering said automatic control ineffective.

46. The combination with a plurality of computing heads, each having a master wheel, of a clutch for each of said master wheels controlling the rotation and direction of rotation of said master wheels, and automatic and manual controlling means for manipulating said clutches simultaneously and separately to corresponding or different positions.

47. The combination with a plurality of computing heads each having a master wheel, of a clutch for each of said master wheels controlling the rotation and direction of rotation of said master wheels, automatic and manual controlling mechanism for manipulating said clutches simultaneously and separately to corresponding or different positions, tens-carrying mechanism for each of said computing heads, and clutches for controlling the rotation and direction of rotation of said tens-carrying mechanism, said controlling mechanism having means for manipulating said last-mentioned clutches concomitantly with said first-mentioned clutches.

48. The combination with a plurality of computing heads, of tens-carrying mechanism for each of said computing heads, clutches for controlling the rotation and direction of rotation of said tens-carrying mechanism, and automatic controlling mechanism having means for manipulating said clutches simultaneously and separately to corresponding or different positions.

49. The combination with a typewriting mechanism including a carriage, of a computing mechanism, a rotary control for governing the state of said computing mechanism as to adding, subtracting and remaining neutral, and means actuated by said carriage for rotating said control.

50. The combination with a computing head including a master wheel, of mechanism for determining the rotation of said master wheel, manual means for controlling said mechanism, and automatic means for controlling said mechanism.

51. The combination with a typewriting mechanism including a carriage, of computing mechanism including a master wheel, and means for controlling the direction of rotation of said master wheel from said carriage, so as to control the character of computation carried on by said computing mechanism.

52. The combination with a computing head, of a master wheel for said computing head, a source of power for rotating said master wheel, and means for enabling said source of power to traverse said master wheel with respect to said head.

53. The combination with two primary elements comprising a computing head and a master wheel for actuating said computing head, of a source of power for rotating said master wheel so as to run up numbers on said computing head, said primary elements having a relative travel, and means for enabling said source of power to cause a relative travel between said primary elements.

54. The combination with a typewriter carriage, of a computing mechanism having a traveling element, means for enabling said carriage to traverse said traveling element in one direction, and a source of power for traversing said traveling element in the opposite direction.

55. The combination with a plurality of computing heads, of means individual to each head for governing the state thereof, a single locking means common to all of said first-mentioned means for securing them in any adjusted position, and means for shifting said locking means out of the way to release all of said first-mentioned means concomitantly.

56. The combination with a computing mechanism, of a state-controlling means for governing the character of computation carried on by said computing mechanism, automatic means for controlling said state-controlling means, locking means for said state-controlling means, and shifting means for concomitantly rendering said locking means ineffective and said automatic means effective.

57. The combination with a computing mechanism, of an automatic control for governing the state of said computing mechanism, and means for connecting said automatic control with or disconnecting it from said computing mechanism at will.

58. The combination with a typewriting mechanism including a traveling carriage, of a computing mechanism including a traveling master wheel, a motor common to said typewriting mechanism and said computing mechanism, and connections enabling said motor to rotate said master wheel, to traverse said carriage and to traverse said master wheel.

59. The combination with a series of computing heads, of an individual master wheel for each of said heads, a master wheel shaft for each of said master wheels, a traveling carriage for determining whether said master wheels shall be effective on said computing heads and whether they shall add or subtract, a common drive shaft for all of said master wheel shafts, and means for intermittently connecting said master wheels with said carriage.

60. The combination with a typewriting mechanism including a traveling carriage, of a computing mechanism connected to act concomitantly with said typewriting mechanism, and a joint motive means common to said carriage and said computing mechanism arranged to transverse said carriage and to drive said computing mechanism.

61. The combination with a typewriting mechanism including a traveling carriage, of a computing mechanism connected to act concomitantly with said typewriting mechanism, a joint motive means common to said carriage and said computing mechanism arranged to traverse said carriage and to drive said computing mechanism, a slip connection between said common motive means and said carriage, and a slip connection between said motive means and said computing mechanism so that said motive means can alternatively drive said carriage or said computing mechanism.

62. The combination with a typewriting mechanism including a traveling carriage, of a series of four computing devices, each including two primary elements, to wit, a computing head and a master wheel, mechanism for simultaneously connecting with and disconnecting from said carriage all of one type of said elements of said computing devices, means for individually controlling the activity of said computing devices independently of their connection with said carriage, and a joint means common to all of the parts of the last-mentioned means for driving them in unison to effect a concomitant control of the activity of all of said computing devices.

63. The combination with a typewriting mechanism including a polychrome shift for changing the color of the typewriting and also including a traveling carriage, of a computing mechanism arranged to carry on different types of computation, and automatic means actuated accordant with the position of said carriage for different computing zones or columns, arranged to automatically and concomitantly change both the state of said computing mechanism and the color of typewriting as determined by said polychrome shift.

64. The combination with a typewriter carriage and a single computing device capable of adding or subtracting, of means for intermittently and repeatedly causing said computing device to compute in different columns in a single traverse of the typewriter carriage, a series of cams connected to said carriage, a follower device to run upon said cams, a spring device to hold the follower upon the cams, means controlled by said follower device for determining whether the computing device shall perform addition or subtraction, and means for effecting relative separation between the follower device and cams for silencing the same.

65. The combination with a typewriter carriage and a single computing device capable of adding or subtracting, of means for intermittently and repeatedly causing said computing device to compute in different columns in a single traverse of the typewriter carriage, a follower device to run upon said cams, a spring device to hold the follower upon the cams, means controlled by the follower for determining whether the computing device shall perform addition or subtraction, means for effecting relative separation between the follower device and cams for silencing the same, and manual means for causing the computing device to add or subtract.

66. In a combined typewriting and computing machine, the combination with a traveling carriage and cams connected to move step by step with said carriage, of a computing device, a follower device controlled by said cams to cause said computing device to be effective to add or subtract, resilient means normally holding said follower device effective against said cams, and a handle manually operable to effect separation of said cams and follower device to manually determine whether said computing device shall add or subtract.

67. In a combined typewriting and computing machine, the combination with a driving device and a computing device, of a master wheel for driving said computing devce to an extent determined by said driving device, a reversing gear between said driving device and said master wheel, a computing carriage forming part of said machine, a traveling carriage for said typewriter, means for intermittently and repeatedly connecting said carriages together in one traverse of the typewriter carriage, cams traveling step by step with the typewriter carriage, a follower device for said cams, resilient means adapted to hold said follower device in the path of said cams to control said reversing device so that said computing device may either add or subtract in a manner determined by the travel of the typewriter carriage, and a lever manually operable to effect separation between said cams and said follower device to enable the operator to manually shift said reversing mechanism.

68. The combination with a typewriter carriage and computing mechanism capable of adding or subtracting, of a series of cams connected to said carriage, a follower device to run upon said cams, a spring device to hold the follower upon the cams, means controlled by said follower device for determining whether the computing mechanism shall perform addition or subtraction, and means for effecting a relative separation between the follower device and the cams for silencing the same.

69. In a calculating machine, the combination of a totalizer, master mechanism therefor, cam operated controlling means for causing said master means to add or subtract, other controlling means for causing said master means to add or subtract, each of said controlling means being adapted to be rendered non operative, and a handle for simultaneously rendering one of said controlling means operative and the other non operative, and vice versa.

70. In a calculating machine, the combination of a totalizer, master mechanism therefor, cam operated controlling means for causing said master means to add, subtract or not operate, other controlling means for causing said master means to add or subtract, each of said controlling means being adapted to be rendered non-operative, and a handle for simultaneously rendering one of said controlling means operative and the other non operative, and vice versa.

71. The combination with a typewriting mechanism; of computing mechanism operable concomitantly with said typewriting mechanism; a typewriter carriage; a bar moving therewith; and a control for said computing mechanism, said control including a plurality of cam sections mounted on said bar, and a follower cooperating with said cam sections.

72. In a computing machine, the combination of a traveling totalizing mechanism, a framework moving therewith, a pair of cams mounted in said framework and each of a length corresponding substantially to the length of said mechanism, said cams being adjustable to a plurality of positions, and followers operated by said cams adapted to selectively control computation.

73. The combination with a typewriting mechanism; of computing mechanism operable concomitantly with said typewriting mechanism; a typewriter-carriage; a bar moving therewith; and a control for said computing mechanism, said control including a plurality of adjustable cam-sections mounted on said bar and a follower co-operating with said adjustable cam-sections.

74. The combination with a typewriter-carriage, of one or more computing heads, controlling mechanism for governing the state of said computing heads as to the character of work carried on thereby, and stops carried by said carriage for controlling the position of said carriage and also for governing the action of said controlling mechanism.

75. The combination with a typewriter-carriage, of one or more computing heads, controlling mechanism for governing the state of said computing heads as to the character of work carried on thereby, and stops carried by said carriage for governing the action of said controlling mechanism; said controlling mechanism including a plurality of tappets arranged to be brought successively into individual operation.

76. The combination with a computing head, of a source of power for actuating said computing head, keys for controlling the actuation of said computing head by said source of power, and means operated by said source of power for controlling the state of said computing head as to the character of the work carried on thereby.

77. The combination with a computing head, of a source of power for actuating said computing head, means operated by said source of power for controlling the state of said computing head as to the character of the work carried on thereby, and manual means for controlling the change in state of said computing mechanism by said first-mentioned means by connecting said first-mentioned means with said source of power.

78. The combination with a computing head, of a source of power for actuating said computing head, manual means independent of said source of power for controlling the state of said computing head, and means operated by said source of power for controlling the state of said computing head.

79. The combination with a computing head, of a source of power for actuating said computing head, manual means independent of said source of power for controlling the state of said computing head, means operated by said source of power for controlling the state of said computing head, and manual means for controlling the change in state of said computing head by said second-mentioned means by connecting said second-mentioned means with said source of power.

80. The combination with a computing head, of a source of power for actuating said computing head, a carriage, and carriage-controlled means operable by said source of power for controlling the state of said computing head as to the character of the work carried on thereby.

81. The combination with a carriage, of means for determining the position of said carriage to a plurality of predetermined points, one or more computing heads, controlling mechanism for governing the state of said computing heads, and means connectible to said first-mentioned means so as to operate concomitantly therewith, for governing the actuation of said controlling mechanism at intervals corresponding to the occupancy by said carriage of said positions at said predetermined points.

82. The combination with a carriage, of means for determining the position of said carriage to a plurality of predetermined points, one or more computing heads, controlling mechanism for governing the state of said computing heads, means connectible to said first-mentioned means so as to operate concomitantly therewith, for governing the actuation of said controlling mechanism at intervals corresponding to the occupancy by said carriage of said positions at said predetermined points, and means for rendering said second-mentioned means inoperative.

83. The combination with a carriage, of means for determining the position of said carriage to a plurality of predetermined points, one or more computing heads, controlling mechanism for governing the state of said computing heads, means connectible to said first-mentioned means so as to operate concomitantly therewith, for governing the actuation of said controlling mechanism at intervals corresponding to the occupancy by said carriage of said positions at said predetermined points, and manual means for causing the actuation of said controlling mechanism.

84. The combination with a carriage, of means for determining the position of said carriage to a plurality of predetermined points, one or more computing heads, controlling mechanism for governing the state of said computing heads, means connectible to said first-mentioned means so as to operate concomitantly therewith, for governing the actuation of said controlling mechanism at intervals corresponding to the occupancy by said carriage of said positions at said predetermined points, means for rendering said second-mentioned means inoperative, and manual means for causing the actuation of said controlling mechanism.

85. The combination with a plurality of computing heads, of individual manual means for controlling the state of each computing head, a source of power, and means for controlling the state of all of said computing heads actuated by said source of power.

86. The combination with one or more computing heads, of controlling mechanism for governing the state of said computing heads, said controlling mechanism embodying a plurality of cams, a source of power normally disconnected from said controlling mechanism, and means for connecting said source of power with said controlling mechanism, so as to bring said cams successively into co-operation with said computing heads.

87. The combination with one or more computing heads, of controlling mechanism for governing the state of said computing heads, a source of power normally disconnected from said controlling mechanism, and means for connecting said source of power to said controlling mechanism, whereby said controlling mechanism will be operated to bring said computing heads to different states according to a predetermined plan.

88. The ecombination with one or more computing heads, of a carriage, carriage-controlled mechanism for governing the state of said computing heads, a source of power normally disconnected from said governing mechanism, means for connecting said source of power to said governing mechanism, whereby said governing mechanism will be operated to bring said computing heads to different states according to a predetermined plan, and means for reversing the direction of action of said governing mechanism.

89. The combination with one or more computing heads, of controlling mechanism for determining the state of said computing heads, means for rotating said controling mechanism, and means for reversing the direction of rotation of said controlling mechanism.

90. The combination with one or more computing heads, of controlling mechanism for determining the state of said computing heads, means for rotating said controlling mechanism, and means for reversing the direction of rotation of said controlling mechanism; said controlling mechanism including a plurality of cams adapted to be brought successively into operation.

91. The combination with one or more computing heads, of a controlling mechanism for governing the state of said computing heads, means for actuating said controlling mechanism, means for causing said first-mentioned means to actuate said controlling mechanism in one direction, and means for causing said first-mentioned means to actuate said controlling mechanism in the opposite direction.

92. The combination with one or more computing heads, of controlling mechanism for governing the state of said computing heads, a typewriter-carriage, and means for rotating said controlling mechanism in one direction during the movement of said carriage in one direction and for rotating said controlling mechanism in the opposite direction during the movement of said carriage in the opposite direction.

93. The combination with one or more computing heads, of controlling mechanism for governing the state of said computing heads, a typewriter-carriage, and means for actuating said controlling mechanism in one direction during the movement of said carriage in one direction and for actuating said controlling mechanism in the opposite direction during the movement of said carriage in the opposite direction.

94. The combination with one or more computing heads, of clutches shiftable to change the state of said computing heads, motive means for actuating certain parts of said computing heads, and means for enabling the shifting of said clutches by said motive means.

95. The combination with one or more computing heads, of clutches shiftable to change the state of said computing heads, controlling mechanism for shifting said clutches, motive means for operating said controlling mechanism, and a key for controlling the connection of said controlling mechanism with said motive means.

96. The combination with numeral-keys and a plurality of computing heads, of means for actuating said heads, means for governing the state of said computing heads as so actuated, and a single key for actuating said governing means to govern the state of all of said computing heads concomitantly.

97. The combination with typewriting mechanism, including a carriage having a series of column-stops corresponding to the several columns to be written on the worksheet on said carriage, of computing mechanism including a plurality of computing heads, and controlling mechanism, for changing the state of said computing heads at each column, having a series of positions, certain of which are occupied by cams forming a part of said controlling mechanism, said positions corresponding to said column-stops.

98. The combination with typewriting mechanism, including a carriage having a series of column-stops corresponding to the several columns to be written on the worksheet on said carriage, of computing mechanism including a plurality of computing heads, controlling mechanism, for changing the state of said computing heads at each column, having a series of positions, certain of which are occupied by cams forming a part of said controlling mechanism, said positions corresponding to said column-stops, and means for enabling the concomitant movement of said column-stops and said controlling mechanism.

99. The combination with a plurality of computing heads, each having tens-carrying mechanism, of individual means for controlling the rotation and direction of rotation of each tens-carrying mechanism, a series of cams for controlling each of said means, said cams being movable so as to be brought successively into action, a source of power for driving certain parts of said computing heads, and mechanism for connecting said source of power with said cams, so that said cams may be driven by said source of power.

100. The combination with a plurality of computing heads, of a source of power for operating certain parts of said computing heads, an automatic mechanism for controlling the state of all of said computing heads, and connections enabling the actuation of said automatic mechanism by said source of power.

101. The combination with a computing head, of a clutch for determining the state of said computing head, a setter for shifting said clutch in one direction, a series of cams successively and individually operative to shift said clutch in the opposite direction, a source of power, and means for causing said source of power to control said setter and said cams.

102. The combination with a computing head, of a typewriter-carriage, a clutch controlling the state of said computing head, a setter for shifting said clutch in one direction, cams successively and individually operative to shift said clutch in the opposite direction, and means controlling the movement of said setter and said cams from said carriage.

103. The combination with a computing mechanism and a traveling carriage, of controlling means for governing the state of said computing mechanism according to a predetermined sequence during the travel of said carriage, means for driving said controlling means in a certain direction, and separate means for reversing the drive of said controlling means to bring it back to a normal starting position.

104. The combination with a computing mechanism, of controlling means for governing the state of said computing mechanism according to a predetermined sequence, means for driving said controlling means in a certain direction, means for reversing the drive of said controlling means to bring it back to a normal starting position, and separate means for reversing said controlling means a single step.

105. The combination with a typewriting mechanism including a typewriter-carriage, for writing a series of columns of figures, of a computing mechanism for computing said series of columns of figures capable of existing under a plurality of different states, and automatic mechanism detached from said carriage and yet controlled by said carriage brought in play before the writing of each column in order to control the state of said computing mechanism for each column.

106. The combination with a computing mechanism, of a source of power for operating certain parts of said computing mechanism, an automatic mechanism for controlling the state of said computing mechanism according to a predetermined sequence, and connections enabling the actuation of said automatic mechanism by said source of power.

107. The combination with computing mechanism capable of existing under a plurality of states, of power-operated means for driving said mechanism, keys for controlling the operation of said computing mechanism by such power, and a connection from said power-operated means for governing the state of said computing mechanism.

108. The combination with a computing mechanism capable of existing under a plurality of states, of power-operated means for driving said mechanism, keys for controlling the actuation of said computing mechanism by such power, a carriage, and a carriage-controlled connection from said power-operated means for governing the state of said computing mechanism.

109. The combination with a computing mechanism, of controlling means for governing the state of said computing mechanism according to a predetermined sequence, and a key for temporarily reversing said controlling means to arrive at some previous state in the predetermined sequence.

110. The combination with a computing mechanism, of a rotary controlling means for governing the state of said computing mechanism, a traveling carriage, a carriage-controlled means for effecting a rotation of said controlling means in one direction, and a carriage-controlled means for effecting a rotation of said controlling means in the opposite direction.

111. The combination with a computing mechanism, of a rotary controlling means for governing the state of said computing mechanism, a traveling carriage, a carriage-controlled means for effecting a rotation of said controlling means in one direction, and manual means for effecting a rotation of said controlling means in the opposite direction.

112. The combination with a computing mechanism, of controlling means for governing the state of said computing mechanism, automatic means for effecting a controlling action of said controlling means, and manual means for effecting a controlling action of said controlling means.

113. The combination with a computing mechanism, of a rotary controlling means for governing the state of said computing mechanism, means for rotating said controlling means in a given direction to effect a predetermined sequence of action of said controlling means, so as to afford a series of predetermined states of said computing mechanism, and means for rotating said controlling means in the opposite direction, to obtain any previous state of said computing mechanism.

114. The combination with numeral-keys and a plurality of computing heads, of tabulating mechanism including tabulating keys for determining computing zones for said computing heads, controlling means for determining how said numeral-keys shall be effective on said heads, and another single key for actuating said controlling means to govern the state or all of said heads concomitantly.

115. In a combined typewriting and computing machine, the combination with a traveling carriage and means controlled in accordance with the movement of said carriage for selectively determining the state of computations, of other means for causing said computation state-determining means to be returned to its initial position.

116. The combination with one or more computing heads, of controlling mechanism for governing the state of said heads, said controlling mechanism including a series of cams, means for intermittently moving said cams by groups into an effective position, and a reversing device for reversing the order of operation of said controlling mechanism.

117. The combination with one or more computing heads, of controlling mechanism for governing the state of said computing heads, said controlling mechanism including an array of cams to be brought into play successively, a gear for so bringing them into play, and a reverse key for bringing them into play in reverse order.

118. The combination with one or more computing heads, of means shiftable to change the state of said computing heads, controlling mechanism for so shifting said means, a source of power for operating said controlling mechanism, and a key for controlling the connection of said source of power and said controlling mechanism.

119. The combination with a plurality of computing heads, each having tens-carrying mechanism, of individual means for controlling the rotation and direction of rotation of each tens-carrying mechanism, a series of cams for controlling each of said individual means, a source of power for driving certain parts of said computing heads, and mechanism for connecting said source of power to cause said cams to be effective for such controlling.

120. The combination with a plurality of computing heads, each embodying a master wheel and a tens-carrying mechanism, of individual shifting mechanism for concomitantly changing the state of action of said master wheel and said tens-carrying mechanism, individual selecting means for determining the position of said shifting mechanism for each computing head, and a single actuator for manipulating all of said selecting means concomitantly.

121. The combination with a plurality of computing heads, of individual means for controlling the stage of action of each computing head, latches for each of said individual means, for maintaining said means in any position of adjustment, a single actuator for controlling concomitantly all of said means, and a throw-off for rendering said latches inoperative while said actuator is in operation.

122. The combination with a computing head capable of inaction and action to perform a variety of computations, of means for changing the action of said computing head, and rotary reciprocating means for governing said first-mentioned means.

123. The combination with a computing head capable of a plurality of states of action and inaction, of shifting means for determining the state of said computing head, controlling means for governing said shifting means, and an actuator for manipulating said controlling means, said controlling means including a shaft and a plurality of cams carried by said shaft.

124. The combination with a computing head having a plurality of states of action and inaction, of shifting means for determining the state of said computing head, and controlling means for said shifting means acting, at each operation thereof, to move said shifting means to a predetermined point, and also capable of action to move said shifting means to variable distances from said predetermined point.

125. The combination with a computing head, of shifting means for determining the state of said computing head, and controlling means for governing said shifting means, said controlling means acting, at each operation, to move said shifting means to a predetermined position, and also capable of acting to leave said shifting means at said predetermined position or else move said shifting means to any one of a plurality of points at variable distances from said predetermined position.

126. The combination with a computing head, of shifting means for determining the state of said computing head, and controlling means for governing said shifting means, said controlling means acting, at each operation, to move said shifting means to a predetermined position, and also capable of acting to leave said shifting means at said predetermined position or else move said shifting means to any one of a plurality of points at variable distances from said predetermined position; said controlling means having a plurality of cams for determining the final position of said shifting means after a movement of said controlling means.

127. The combination with a computing head, of shifting means for determining the state of said computing head, and controlling means for governing said shifting means, said controlling means acting, at each operation, to move said shifting means to a predetermined position, and also capable of acting to leave said shifting means at said predetermined position or else move said shifting means to any one of a plurality of points at variable distances from said predetermined position, said controlling means embodying a shaft and a plurality of cams, arranged for different effects, carried by said shaft.

128. The combination with a computing head, of shifting means for determining the state of said computing head, controlling means for governing said shifting means, said controlling means acting, at each operation, to move said shifting means to a predetermined position, and also capable of acting to leave said shifting means at said predetermined position or else move said shifting means to any one of a plurality of points at variable distances from said predetermined position, said controlling means embodying a shaft and a plurality of cams, arranged for different effects, carried by said shaft, and an actuator for reciprocating said shaft.

129. The combination with a computing head, of shifting means for determining the state of said computing head, a rotary shaft, and a plurality of cams of variable effects brought successively into co-operation with said shifting means by the rotation of said shaft, to govern the control of the state of said computing head by said shifting means.

130. The combination with a computing head, of means for determining the state of said computing head, a spring for normally tending to move said means to a predetermined position, and a plurality of cams capable of being brought successively into cooperation with said means for determining the operating position of said means and thus the state of said computing head.

131. The combination with a computing head having a master wheel and tens-carrying mechanism, of gearing for determining the drive and direction of drive of said master wheel and said tens-carryin mechanism, a composite lever for concomitantly actuating both sets of gearing for controlling said master wheel and said tens-carrying mechanism, means for manipulating said lever in one direction, and a series of cams of variable effect for manipulating said lever in the opposite direction at different times.

132. The combination with a plurality of computing heads, each having a master wheel and tens-carrying mechanism, of changeable gearing for each of said master wheels and each of said tens-carrying mechanisms, a composite lever for each of said computing heads for concomitantly changing the gearing for the master wheel and tens-carrying mechanism, means for shifting said composite levers in one direction, a shaft, and a series of cams, for each of said levers, carried by said shaft, for manipulating said composite levers in the opposite direction variable extents according to the effective magnitude of the active cams.

133. The combination with a computing head including a master wheel and a tens-carrying mechanism, of means for determining the action of said master wheel, means for determining the action of said tens-carrying mechanism, a composite lever for concomitantly shifting both of said means, a plurality of cams, and an actuator for manipulating said lever through the medium of said cams.

134. The combination with a computing head, of variable drive gearing for controlling the state of said head, a lever for shifting said gearing, a latch for holding said lever in a plurality of positions of adjustment, means for controlling the position of said lever, said means including a plurality of cams, and a throw-off for disconnecting said latch from said lever, so as to permit said means to easily manipulate said lever.

135. The combination with a computing head capable of existing under a plurality of states, of means for changing the state under which said computing head exists at any particular moment, and automatic means for insuring a correct determination of the state of each operation of said first-mentioned means.

136. The combination with a plurality of computing heads capable of existing under a plurality of different states, of controlling means individual to each head, whereby the state thereof may be varied, locking means for each of said controlling means for holding them in any adjusted position, means for actuating all of said controlling means from a common point, and a throw-off for disconnecting all of said locking means when said controlling means are actuated from said common point.

137. The combination with a plurality of computing heads capable of existing under a plurality of different states, of controlling means individual to each computing head, whereby the state thereof may be governed, and means acting to unset all of said controlling means and subsequently shift them to predetermined positions corresponding to predetermined states.

138. The combination with a computing head, of a shifting lever for controlling the state of said computing head, and striking means for alternately moving said shifting lever up and down to any one of a plurality of positions corresponding to different states of the computing head.

139. The combination with a computing mechanism operable in a series of successive computing zones, of a state-controlling mechanism for varying the character of computation carried on by said computing mechanism, a controller having a predetermined conformation corresponding to a definite sequence or series of states for a cycle of movement thereof, and means for moving said controller to control the state.

140. The combination with a computing head, of means for determining the state of said computing head, a setter for manipulating said means to a predetermined point, and selecting means for determining the subsequent position of said first-mentioned means, so as to determine the state of said computing head.

141. The combination with a computing head, of means for determining the state of said computing head, a setter for manipulating said means to a predetermined point, selecting means for determining the subsequent position of said first-mentioned means, so as to determine the state of said computing head, and an actuator for causing the successive co-operation of said setter and said selecting means with said first-mentioned means.

142. The combination with a plurality of computing heads, of a rotary governing mechanism for determining the states of all of said heads, said governing mechanism being rotatable back or forth to obtain any predetermined combination of states of the several computing heads.

143. The combination with computing mechanism, of manual means for shifting said computing mechanism between addition and subtraction, printing mechanism having two colors, one for printing for addition and the other for subtraction, manual means for shifting to print the different colors, and governing means common to both said manual means for automatically actuating them concomitantly to effect a change in computation with a change in the color of printing.

144. The combination with a plurality of computing heads, of a plurality of cylindrical cams for controlling the state of said computing heads, there being one of said cams for each of said computing heads, and means for rotating said cams in unison so as to concomitantly effect the control of the state of all of said computing heads.

145. The combination with means for printing digits in different colors, of a computing mechanism, means for controlling the color in which digits are printed according to the kind of computation that is made, and means dependent upon the completion of the computation for automatically restoring the color-controlling means to normal position.

146. The combination of numeral-types, keys to control them, a ribbon-vibrating mechanism operable by said keys, a carriage controlled by said keys, means shiftable to cause a different color of ribbon to be vibrated into use at the key strokes, and means connected with said carriage, to operate at a movement thereof, for returning said shiftable means.

147. The combination of numeral-types, keys therefor, a carriage controllable by said keys, a ribbon mechanism shiftable to bring a different color into use, computing mechanism controlled by said keys and changeable from adding condition to subtracting condition, means connected with said carriage to operate at a movement thereof, for effecting a color shift of said ribbon, and means for concomitantly changing the condition of said computing mechanism.

148. The combination of numeral-types, keys therefor, a carriage controllable by said keys, a ribbon mechanism shiftable to bring a different color into use, computing mechanism controlled by said keys and changeable from adding condition to subtracting condition, and a train of mechanism for effecting the following operations concomitantly preparatory to performing a computation, viz: effect a movement of the carriage, change the color of the ribbon, and change the condition of the computing mechanism.

149. The combination with numeral-types and keys therefor, and alphabetical types and keys therefor, of a carriage controllable by said keys and movable into and out of a computing zone, a computing mechanism controllable by said keys and changeable from adding condition to subtracting condition, a ribbon mechanism shiftable to permit different colors of ribbon to be used at will outside of the computing zone, and means for concomitantly changing the condition of the computing mechanism and bringing a different color of the ribbon into use, whereby in a computing zone the color of the type impressions indicates the character of the computation, while outside of the computing zone the different colors of ribbon may be brought into use at will independently of the condition of the computing mechanism.

150. The combination with numeral-types and keys therefor, of a carriage controllable by said keys, a computing mechanism controllable by said keys and changeable from adding condition to subtracting condition, a ribbon mechanism shiftable to bring different colors of ribbon into use, and means having a connection with the carriage for concomitantly changing the condition of the computing mechanism and bringing a different color of the ribbon into use.

151. The combination with numeral-typewriter-types, and a mechanism to compute the numbers written by the types, said mechanism changeable from addition condition to subtraction condition, of means for concomitantly changing the condition of the computing mechanism and bringing a different color into use, and means dependent upon the completion of the computing operation for restoring the original condition of the computing mechanism and the ribbon mechanism.

152. The combination with typewriter-types, and a ribbon mechanism shiftable to bring a different color into use, of a computing mechanism to compute the numbers written by the types through the ribbon, and means dependent upon the completion of the computing operation for bringing a different color of ribbon into use.

153. The combination with typewriter-types, a ribbon mechanism, and means manually shiftable to bring a different color of ribbon into use, of a computing mechanism to compute the numbers written by the types through the ribbon, and means dependent upon the completion of the computing operation for restoring the ribbon to the condition from which it was manually shifted.

154. The combination with computing mechanism shiftable from addition condition to subtraction condition, of type-writing mechanism including means for writing numerals of different characteristics to indicate either addition or subtraction, a carriage, and means associated with said carriage to operate at a movement thereof, for concomitantly changing the condition of the computing mechanism and altering the characteristics of the numeral type impressions.

155. The combination of a letter-feeding typewriter-carriage, alphabet and numeral types and keys therefor, said carriage under the control of said keys, a ribbon mechanism shiftable to bring different colors into use, a computing device, said carriage movable into and out of the computing zone, and said computing device being convertible to add or subtract under the control of the numeral-keys, means to convert said computing device from addition to subtraction and simultaneously shift the ribbon mechanism, and means for shifting the ribbon mechanism independently of the computing device.

156. In a combined typewriting and computing machine, the combination with numeral-keys and convertible computing mechanism, of a polychrome ribbon mechanism, means for causing said computing mechanism to operate and to select the color of said ribbon, and manual means to convert said computing mechanism and select the color of ribbon.

157. In a combined typewriting and computing machine, the combination with numeral-keys and a carriage controlled thereby, of a convertible computing mechanism, means for positioning said carriage, converting said computing mechanism and concomitantly causing a different color of ribbon to be selected, and manual means for converting said computing mechanism and simultaneously selecting a different color of ribbon.

158. The combination with a typewriting mechanism, a shiftable ribbon mechanism, and a convertible computing mechanism, of means dependent upon the operation of the computing mechanism for both converting said computing mechanism and selecting a different color of ribbon preparatory to the next computation.

159. The combination of a typewriter-carriage, numeral-type-keys controlling said carriage, a shiftable polychrome ribbon mechanism, means to shift the ribbon mechanism to bring a different color into use, and means connected with said carriage, to operate at a movement thereof, preparatory to writing a new number, for shifting the ribbon mechanism back to original condition.

160. The combination of a typewriter-carriage, numeral-type-controlling keys, shiftable means for altering the character of type impressions made upon the paper at the operation of said keys, means to enable said carriage to be controlled by said keys, and means connected with said carriage, to operate at a movement thereof preparatory to writing a new number, for restoring said shiftable means to original condition.

161. The combination of a typewriter-carriage, numeral-type-keys controlling said carriage, a computing mechanism convertible from addition to subtraction, a ribbon mechanism shiftable to bring a different color into use, and means connected with said carriage, to operate at a movement thereof preparatory to writing a new number, for converting the computing mechanism and shifting the ribbon mechanism.

162. The combination of a typewriter-carriage, numeral-type-controlling keys, means to enable the keys to control said carriage, a computing mechanism changeable from a state of addition to a different state, shiftable means for altering the character of type impressions made upon the paper at the operation of said keys, and means connected with said carriage to operate at a movement thereof preparatory to writing a new number, for effecting a change in the state of said computing mechanism and shifting said means for altering the character of type impressions.

WALTER WRIGHT.

Witnesses:
K. FRANKFORT,
C. RIPLEY.

DISCLAIMER.

1,475,152.—*Walter Wright,* New York, N. Y. COMBINED TYPEWRITING AND COMPUTING MACHINE. Patent dated November 20, 1923. Disclaimer filed October 6, 1925, by the assignee, *Underwood Computing Machine Company.*

Hereby enters its disclaimer to claims numbered 42, 57, 68, 74, 75, 76, 77, 78, 79, 80, 87, 96, 97, 100, 106, 107, and 108, the right to said claims having been established by William S. Gubelmann in interference proceeding No. 51,248.

[*Official Gazette November 3, 1925.*]